(12) United States Patent
Suzuki

(10) Patent No.: US 9,371,087 B2
(45) Date of Patent: Jun. 21, 2016

(54) POWER CONVERSION DEVICE AND ELECTRIC POWER STEERING DEVICE USING THE SAME

(71) Applicant: DENSO CORPORATION, Kariya, Aichi-pref. (JP)

(72) Inventor: Takashi Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/597,004

(22) Filed: Jan. 14, 2015

(65) Prior Publication Data

US 2015/0214882 A1  Jul. 30, 2015

(30) Foreign Application Priority Data

Jan. 28, 2014  (JP) .................................. 2014-13145

(51) Int. Cl.
- *H02P 1/00*  (2006.01)
- *B62D 5/04*  (2006.01)
- *B60W 10/08*  (2006.01)
- *B60W 20/00*  (2016.01)

(52) U.S. Cl.
CPC ................ *B62D 5/046* (2013.01); *B62D 5/049* (2013.01); *B60W 10/08* (2013.01); *B60W 20/00* (2013.01); *Y02T 10/7005* (2013.01); *Y02T 10/7077* (2013.01)

(58) Field of Classification Search
CPC . Y02T 10/7005; Y02T 10/7007; Y02T 10/70; B60W 10/08; B60W 20/00
USPC ...................................................... 318/139
See application file for complete search history.

(56) References Cited

U.S. PATENT DOCUMENTS

| | | | |
|---|---|---|---|
| 6,445,155 B1 | 9/2002 | Williams et al. | |
| 2004/0125622 A1* | 7/2004 | Hirono | H02M 7/53873 363/37 |
| 2011/0248657 A1 | 10/2011 | Endoh | |
| 2013/0009587 A1* | 1/2013 | Yabuguchi | H02P 27/08 318/561 |
| 2013/0033209 A1* | 2/2013 | Murata | H02P 23/14 318/400.06 |
| 2013/0314013 A1* | 11/2013 | Ajima | H02P 23/00 318/400.21 |

FOREIGN PATENT DOCUMENTS

| | | |
|---|---|---|
| JP | 6-153526 | 5/1994 |
| JP | 9-172791 | 6/1997 |
| JP | 2008-109768 | 5/2008 |
| JP | 2011120330 A * | 6/2011 |

* cited by examiner

*Primary Examiner* — Kawing Chan
*Assistant Examiner* — Bradley Brown
(74) *Attorney, Agent, or Firm* — Nixon & Vanderhye PC

(57) ABSTRACT

A power conversion device includes: an inverter that includes high potential side switching elements connected to a high potential side and low potential side switching elements connected to a low potential side, and converts a current for supplying a rotating electric machine; a current detector having a sensor disposed on at least one of a positive bus for connecting the high potential side switching elements and a positive side of a DC power supply or a negative bus for connecting the low potential side switching elements and a negative side of the DC power supply; an energization device that energizes the sensor without passing through the inverter; and a controller that acquires a current detection value from the current detector, and controls the inverter and the energization device. The energization device energizes the sensor when all of high or low potential side switching elements are off.

11 Claims, 17 Drawing Sheets

FIG. 4

| | VOLT VECTOR | ON-STATE SW | | |
|---|---|---|---|---|
| | | U | V | W |
| REACTIVE VOLT VECTOR { | V0 | DOWN | DOWN | DOWN |
| ACTIVE VOLT VECTOR { | V1 | UP | DOWN | DOWN |
| | V2 | UP | UP | DOWN |
| | V3 | DOWN | UP | DOWN |
| | V4 | DOWN | UP | UP |
| | V5 | DOWN | DOWN | UP |
| | V6 | UP | DOWN | UP |
| REACTIVE VOLT VECTOR { | V7 | UP | UP | UP |

POWER CONVERSION DEVICE AND ELECTRIC POWER STEERING DEVICE USING THE SAME

CROSS REFERENCE TO RELATED APPLICATION

This application is based on Japanese Patent Application No. 2014-13145 filed on Jan. 28, 2014, the disclosure of which is incorporated herein by reference.

TECHNICAL FIELD

The present disclosure relates to a power conversion device, and an electric power steering device using the power conversion device.

BACKGROUND

Up to now, a technique has been known in which each phase current is detected on the basis of a shunt voltage which is a voltage between both ends of a shunt resistor disposed on a bus of an inverter. For example, in JP-A-2013-17363, a current detection value of a drift current detected in a state where a motor current is assumed to be zero is set as a current offset value, and a current detection value of the motor current is compensated according to the offset value.

The shunt voltage of the shunt resistor disposed on the bus of the inverter may be zero even in a normal state. For that reason, for example, even if abnormality that the shunt voltage is fixed to zero due to short circuit of the shunt resistor occurs, it cannot be discriminated whether the shunt voltage is fixed to zero, or not, in JP-A-2013-17363 corresponding to US 2013/0009587.

SUMMARY

It is an object of the present disclosure to provide a power conversion device that can detect the abnormality of a current detection value, and an electric power steering device using the power conversion device.

According to a first aspect of the present disclosure, a power conversion device includes: an inverter that includes a plurality of high potential side switching elements connected to a high potential side and a plurality of low potential side switching elements connected to a low potential side, and converts a current to be supplied to a rotating electric machine; a current detector that includes a sensor disposed on at least one of a positive bus for connecting the high potential side switching elements and a positive side of a DC power supply or a negative bus for connecting the low potential side switching elements and a negative side of the DC power supply; an energization device that energizes the sensor without passing through the inverter; and a controller that acquires a current detection value from the current detector, and controls the inverter and the energization device. The energization device energizes the sensor when all of the high potential side switching elements are in an off state, or when all of the low potential side switching elements are in an off state.

When the current detection unit is disposed on the positive bus or the negative bus, because the current detection value when the sensor unit energized through the inverter unit may become zero even in a normal state, it cannot be discriminated whether abnormality (hereinafter referred to as "zero fixation abnormality") in which the current detection value is fixed to zero by the short circuit of the sensor unit occurs, or not.

Under the circumstances, the power conversion device according to the present disclosure includes the energization unit that can energize the sensor unit without passing through the inverter unit if all of the high potential side switching elements are off, or if all of the low potential side switching elements are off. In the case where all of the high potential side switching elements are off, or in the case where all of the low potential side switching elements are off, when the sensor unit is energized through the energization unit, if no zero fixation abnormality occurs, the current detection value becomes a given value, and if the zero fixation abnormality occurs, the current detection value becomes zero.

Therefore, the zero fixation abnormality of the current detection unit can be detected on the basis of the current detection value when the sensor unit is energized through the energization unit when all of the high potential side switching elements are off, or when all of the low potential side switching elements are off. As a result, the abnormality of the current detection value can be appropriately detected.

According to a second aspect of the present disclosure, an electric power steering device includes: the power conversion device according to the first aspect of the present disclosure, and the rotating electric machine that outputs an assist torque for assisting a steering operation of a driver of a vehicle.

Since the power conversion device can appropriately detect the abnormality of the current detection value, the power conversion device can avoid an unintended behavior of the rotating electric machine controlled on the basis of the current detection value where abnormality occurs, and can prevent the assist torque having uncomfortable feeling in the driver from being output.

BRIEF DESCRIPTION OF THE DRAWINGS

The above and other objects, features and advantages of the present disclosure will become more apparent from the following detailed description made with reference to the accompanying drawings. In the drawings:

FIG. 4 is an illustrative view illustrating a voltage vector pattern according to the first embodiment of the present disclosure;

DETAILED DESCRIPTION

Hereinafter, a power conversion device according to the present disclosure will be described with reference to the accompanying drawings.

(First Embodiment)

A power conversion device and an electric power steering device according to a first embodiment of the present disclosure are illustrated in FIGS. 1 to 8. Hereinafter, in plural embodiments, substantially the same configurations are denoted by identical symbols, and repetitive description will be omitted.

Figure 1:
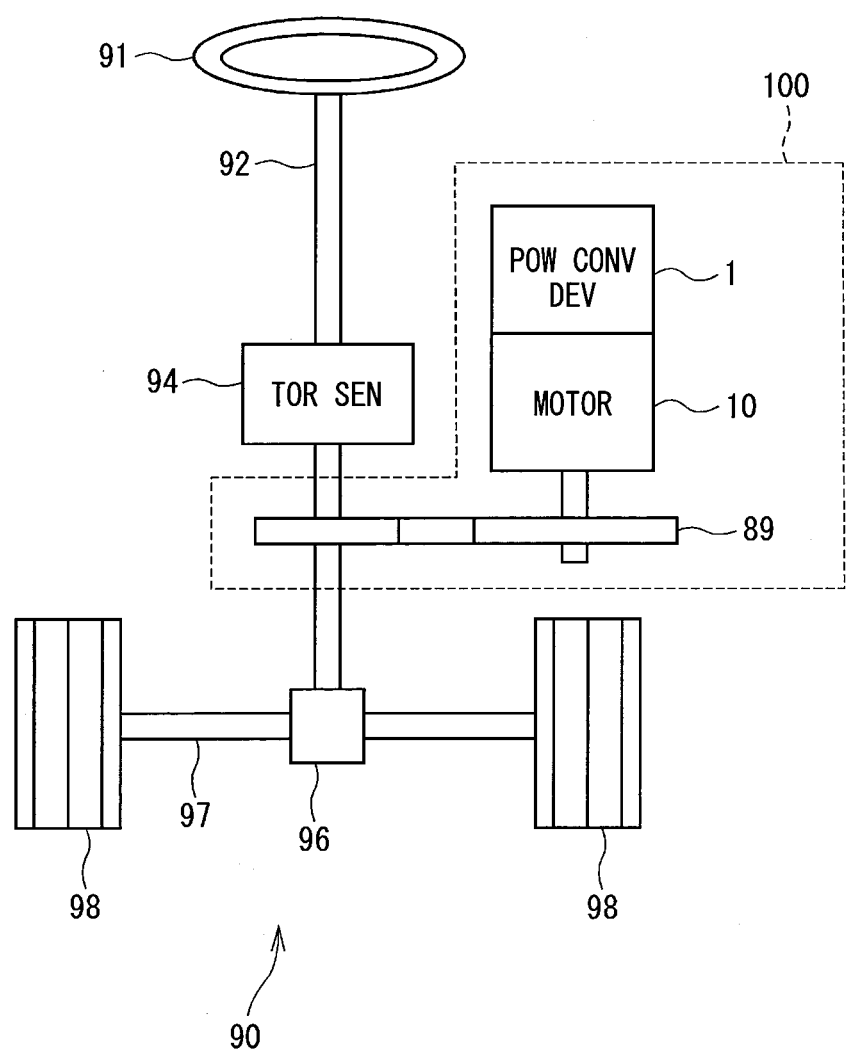
FIG. 1 is a schematic view illustrating an electric power steering device according to a first embodiment of the present disclosure.

As illustrated in FIG. 1, a power conversion device 1 is applied to an electric power steering device 100 for assisting steering operation by a driver together with a motor 10 as a rotating electric machine.

FIG. 1 illustrates an overall configuration of a steering system 90 having the electric power steering device 100. The steering system 90 includes a handle (steering wheel) 91, a steering shaft 92, a pinion gear 96, a rack shaft 97, wheels 98, and the electric power steering device 100.

The handle 91 is connected to the steering shaft 92. The steering shaft 92 is equipped with a torque sensor 94 that detects a steering torque input by operating the handle 91 by the driver. A leading end of the steering shaft 92 is equipped with the pinion gear 96, and the pinion gear 96 is meshed with the rack shaft 97. Both ends of the rack shaft 97 are coupled with a pair of the wheels 98 through a tie rod, etc.

As a result, when the driver rotates the handle 91, the steering shaft 92 connected to the handle 91 rotates. The rotational motion of the steering shaft 92 is converted into a linear motion of the rack shaft 97 by the pinion gear 96, and the pair of wheels 98 is steered to an angle corresponding to the amount of displacement of the rack shaft 97.

The electric power steering device 100 includes the motor 10 that outputs an assist torque for assisting the steering of the handle 91 by the driver, the power conversion device 1 used for drive control of the motor 10, and a reduction gear 89 that reduces the rotation of the motor 10, and transmits the rotation to the steering shaft 92 or the rack shaft 97.

The motor 10 is driven with the supply of an electric power from a battery 80 (refer to FIG. 2) as a DC power supply, and rotationally forwards or reverses the reduction gear 89.

Figure 2:
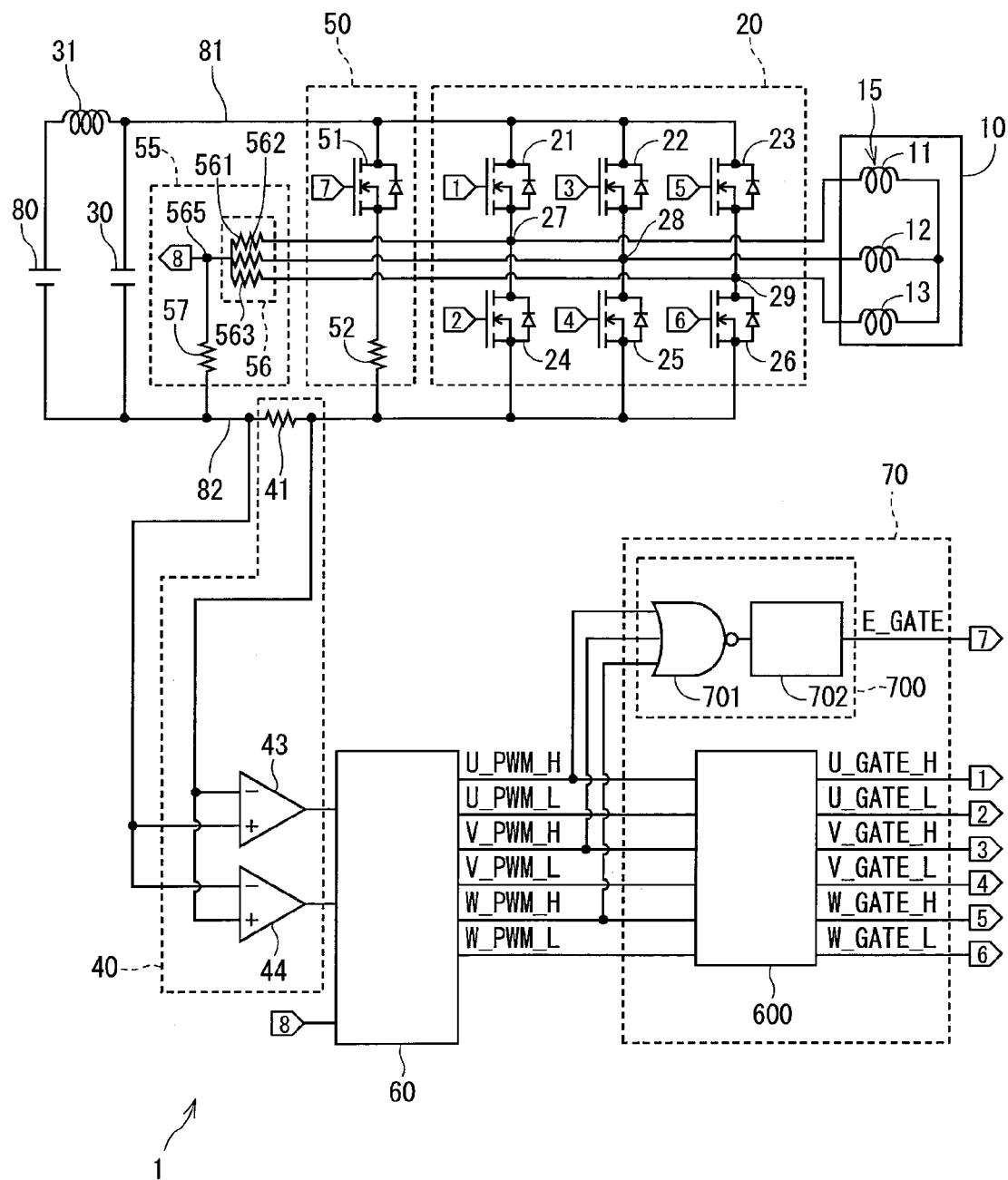
FIG. 2 is a circuit diagram illustrating a configuration of a power conversion device according to the first embodiment of the present disclosure.

The motor 10 is a three-phase brushless motor, and the motor 10 is compatible with "three-phase rotating electric machine". The motor 10 has a rotor and a stator which are not shown. The rotor is formed of a cylindrical member, and has a magnetic pole with a permanent magnet applied to a surface thereof. The stator internally accommodates the rotor to be relatively rotatable. The stator has protrusions that protrude at every given angle in a radially inward direction, and a U-phase coil 11, a V-phase coil 12, and a W-phase coil 13 illustrated in FIG. 2 are wound around the respective protrusions. The U-phase coil 11, the V-phase coil 12, and the W-phase coil 13 configure a winding 15. In this embodiment, it is assumed that a current supplied to the U-phase coil 11 is a U-phase current Iu, a current supplied to the V-phase coil 12 is a V-phase current Iv, and a current supplied to the W-phase coil 13 is a W-phase current Iw. Also, the U-phase current Iu, the V-phase current Iv, and the W-phase current Iw are appropriately called "respective phase currents Iu, Iv, and Iw". Also, a current that flows from an inverter unit 20 side to the coils 11 to 13 side is positive, and a current that flows from the coils 11 to 13 side to the inverter unit 20 side is negative.

Also, the motor 10 is equipped with a position sensor not shown which detects an electric angle θ which is a rotational position of the rotor.

As illustrated in FIG. 2, the power conversion device 1 controls the driving of the motor 10 by pulse width modulation (hereinafter referred to as "PWM"). The power conversion device 1 includes the inverter unit 20, a current detection unit 40, an abnormality check energizing circuit unit 50 as an energization unit, a pseudo neutral point voltage detection unit 55, a microcomputer 60, and a drive circuit unit 70. In this embodiment, a line connected to a positive side of the battery 80 is called a positive bus 81, and a line connected to a negative side of the battery 80 is called a negative bus 82. A voltage of the positive bus 81 is set as a supply voltage PIG, and a voltage of the negative bus 82 is set as a ground voltage GND. The ground voltage GND is set as zero.

In this embodiment, the microcomputer 60 and the drive circuit unit 70 configure "controller".

The inverter unit 20 is a three-phase inverter, and has six switching elements 21 to 26 subjected to bridge connection so as to switch the respective energization of the U-phase coil 11, the V-phase coil 12, and the W-phase coil 13. The switching elements 21 to 26 according to this embodiment are each configured by a MOSFET (metal-oxide-semiconductor field-effect transistor) which is one kind of field effect transistors, but may be configured by another transistor. Hereinafter, the switching elements 21 to 26 are called "SW 21 to 26".

The three SW 21 to 23 have drains connected to the positive bus 81. Also, sources of the SW 21 to 23 are connected to drains of the respective SW 24 to 26. Sources of the SW 24 to 26 are connected to the negative bus 82.

A connection point 27 between the SW21 and the SW24 which are paired is connected to one end of the U-phase coil 11. A connection point 28 between the SW22 and the SW25 which are paired is connected to one end of the V-phase coil 12. A connection point 29 between the SW23 and the SW26 which are paired is connected to one end of the W-phase coil 13.

Hereinafter, the SW 21 to 23 arranged on the high potential side are called "upper SW 21 to 23", and the SW 24 to 26 arranged on the low potential side are called "lower SW 24 to 26". In this embodiment, the upper SW 21 to 23 correspond to "high potential side switching elements", and the lower SW 24 to 26 correspond to "low potential side switching elements".

A capacitor 30 and a choke coil 31 are disposed between the battery 80 and the inverter unit 20, and configure a power filter. As a result, the capacitor 30 and the choke coil 31 reduce noise transmitted from another device sharing the battery 80. Likewise, the capacitor 30 and the choke coil 31 reduce noise transmitted to another device sharing the battery 80 from the inverter unit 20.

The capacitor 30 has a positive electrode connected the positive bus 81, and a negative electrode connected to the negative bus 82. The capacitor 30 stores electric charge to assist power supply to the SW 21 to 26, and suppresses noise components such as a surge current. A voltage across the capacitor 30 is acquired by the microcomputer 60.

The choke coil 31 is disposed between the battery 80 and the capacitor 30, and disposed on the positive bus 81.

The current detection unit 40 has a shunt resistor 41 as a sensor, and operational amplifiers 43 and 44 as two amplifier circuit units. The shunt resistor 41 is disposed between the inverter unit 20 and the capacitor 30, and disposed on the negative bus 82. A voltage between both ends of the shunt resistor 41 is output to the operational amplifiers 43 and 44 as a detection value.

Each of the operational amplifiers 43 and 44 is a reverse phase amplifier.

A non-inverting input terminal of the operational amplifier 43 is connected to the battery 80 side of the shunt resistor 41, and an inverting input terminal of the operational amplifier 43 is connected to the inverter unit 20 side of the shunt resistor 41. A current detection value IA is output to the microcomputer 60 from the operational amplifier 43.

A non-inverting input terminal of the operational amplifier 44 is connected to the inverter unit 20 side of the shunt resistor 41, and an inverting input terminal of the operational amplifier 44 is connected to the battery 80 side of the shunt resistor 41. That is, the operational amplifier 44 is connected opposite in positive and negative to the operational amplifier 43. A current detection value IB is output to the microcomputer 60 from the operational amplifier 44.

The abnormality check energizing circuit unit 50 has a switch unit 51 and a resistor 52, and is disposed between the capacitor 30 and the inverter unit 20.

Like the SW elements 21 to 26, the switch unit 51 is formed of a MOSFET, but may be formed of another transistor. A drain terminal of the switch unit 51 is connected to the positive bus 81, and a source terminal of the switch unit 51 is connected to the resistor 52.

When the switch unit 51 turns on, the shunt resistor 41 is energized, or current is supplied without passing through the inverter unit 20.

The resistor 52 has one end connected to a source terminal of the switch unit 51, and the other end connected to the negative bus 82 on the inverter unit 20 side of the shunt resistor 41. A resistance value of the resistor 52 is appropriately set so that current detection values IA and IB when the switch unit 51 turns on can be acquired by the microcomputer 60. It is assumed that the current detection value when the switch unit 51 turns on is an abnormality check current value Ir.

When the resistance value of the resistor 52 is appropriately set, a current supplied to the switch unit 51 can be made smaller than the current supplied to the SW 21 to 26. As a result, since the switch unit 51 can employ an element small in energizable current as compared with the SW 21 to 26, the switch unit 51 can be reduced in size as compared with a case in which the same element as that of the SW 21 to 26 is used.

In this embodiment, a current supplied to the shunt resistor 41 when the switch unit 51 turns on is detected, to thereby detect a zero fixation abnormality which is an abnormality that the current detection values IA and IB caused by short circuit of the shunt resistor 41 are fixed to zero. The detection of the zero fixation abnormality will be described later.

Also, the abnormality check energizing circuit unit 50 also functions as a discharge circuit of the capacitor 30, and can pull out the electric charge stored in the capacitor 30 upon turning on the switch unit 51, for example, at the time of initial check.

The pseudo neutral point voltage detection unit 55 has a resistor group 56, and a pull-down resistor 57.

The resistor group 56 includes resistors 561, 562, and 563. One end of the resistor 561 is connected to a connection point 27 between the SW 21 and the SW 24. One end of the resistor 562 is connected to a connection point 28 between the SW 22 and the SW 25. One end of the resistor 563 is connected to a connection point 29 between the SW 23 and the SW 26. The other ends of the resistors 561, 562, and 563 are connected to each other by a connecting unit 565.

The pull-down resistor 57 has one end connected to the connecting unit 565, and the other end connected to the negative bus 82 on the battery 80 side of the shunt resistor 41.

In this embodiment, the connecting unit 565 is regarded as a pseudo neutral point of the winding 15. A voltage of the connecting unit 565 is output to the microcomputer 60 as a pseudo neutral point voltage Vn through an amplifier unit not shown.

The microcomputer 60 governs the control of the overall power conversion device 1, and is formed of a microcomputer that executes various arithmetic operations. The microcomputer 60 acquires the current detection values IA, IB, the voltage across the capacitor 30, and an electric angle θ of the motor 10, generates PWM signals U_PWM_H, U_PWM_L, V_PWM_H, V_PWM_L, W_PWM_H, and W_PWM_L under the PWM control, and outputs the PWM signals to the drive circuit unit 70.

Figure 3:
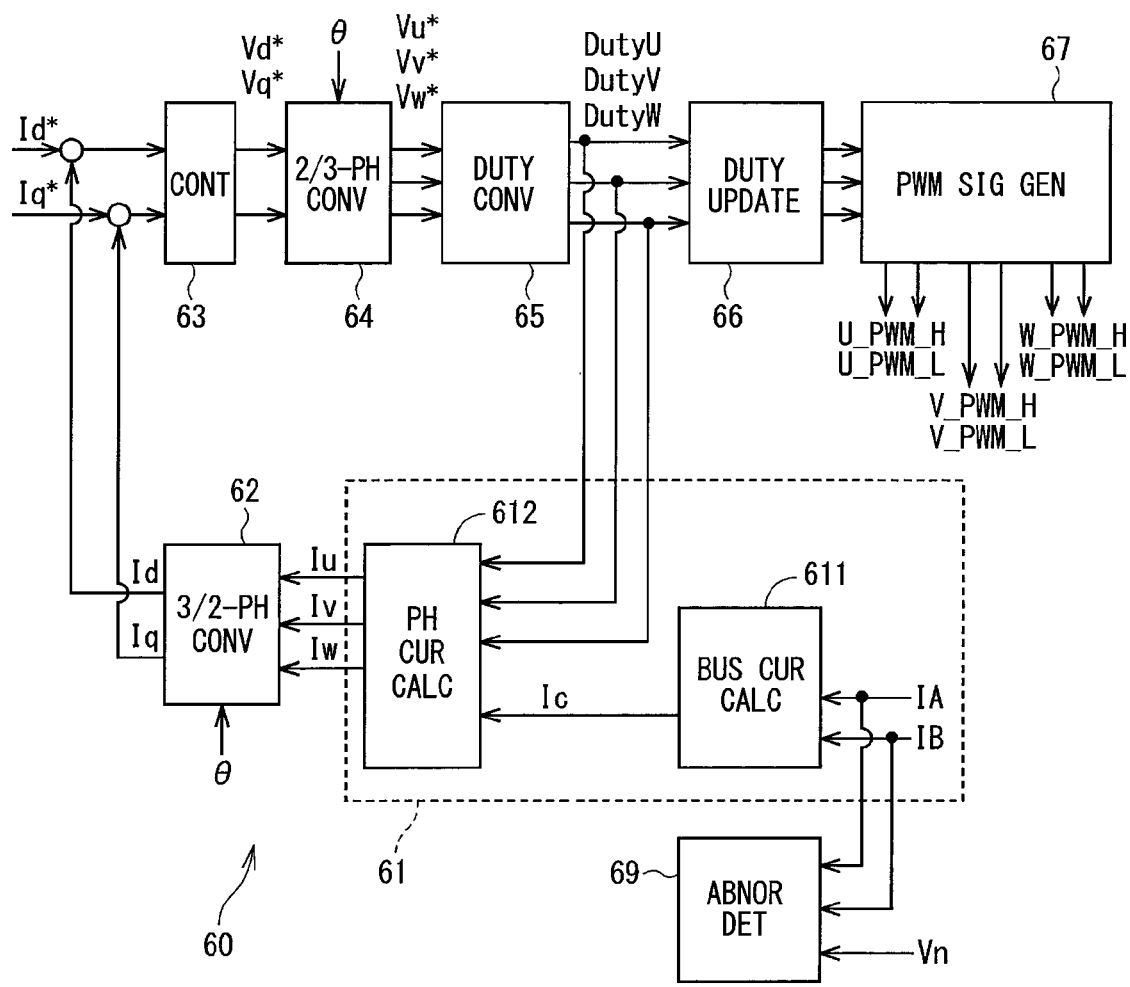
FIG. 3 is a block diagram illustrating a configuration of a microcomputer according to the first embodiment of the present disclosure.

As illustrated in FIG. 3, the microcomputer 60 includes a current calculation unit 61, a three phase/two phase conversion unit 62, a controller 63, a two phase/three phase conversion unit 64, a duty conversion unit 65, a duty update unit 66, a PWM signal generation unit 67, and an abnormality detection unit 69.

The current calculation unit 61 includes a bus current calculation unit 611 and a phase current calculation unit 612. The bus current calculation unit 611 calculates a bus current Ic on the basis of the current detection value IA acquired from the operational amplifier 43, and the current detection value IB acquired from the operational amplifier 44. The phase current calculation unit 612 calculates the respective phase currents Iu, Iv, and Iw on the basis of the bus current Ic. The detail of current calculation in the current calculation unit 61 will be described later.

The three phase/two phase conversion unit 62 calculates a d-axis current detection value Id and a q-axis current detection value Iq by dq conversion based on the respective phase currents Iu, Iv, and Iw, and the electric angle θ.

The controller 63 performs a current feedback calculation on the basis of a d-axis current command value Id* and a q-axis current command value Iq*, and the d-axis current detection value Id and the q-axis current detection value Iq, and calculates a d-axis voltage command value Vd* and a q-axis voltage command value Vq*. In detail, the controller 63 calculates a current deviation ΔId between the d-axis current command value Id* and the d-axis current detection value Id, and a current deviation Δ Iq between the q-axis current command value Iq* and the q-axis current detection value Iq, and calculates the voltage command values Vd* and Vq* to converge the current deviations Δ Id and Δ Iq to 0 so that the current detection values Id and Iq follow the current command values Id* and Iq*.

The two phase/three phase conversion unit 64 calculates a U-phase voltage command value Vu*, a V-phase voltage command value Vv*, and a W-phase voltage command value Vw* by reverse dq conversion on the basis of the voltage command values Vd* and Vq*, and the electric angle θ.

The duty conversion unit 65 converts the voltage command values Vu*, Vv*, and Vw* into a U-phase duty command value DutyU, a V-phase duty command value DutyV, and a W-phase duty command value DutyW on the basis of the voltage across the capacitor 30, respectively. The duty conversion unit 65 appropriately conducts a dead time correction, a correction for ensuring a current detection period, and a change in a neutral point voltage.

The duty update unit 66 sets and updates the duty command values DutyU, DutyV, and DutyW calculated in the duty conversion unit 65.

The PWM signal generation unit 67 compares the duty command values DutyU, DutyV, and DutyW with a PWM reference signal C of a triangle wave, generates the PWM signals U_PWM_H, U_PWM_L, V_PWM_H, V_PWM_L, W_PWM_H, and W_PWM_L related to the on/off switching of the SW 21 to 26, and outputs the PWM signals to the drive circuit unit 70. In this embodiment, if the PWM signals U_PWM_H, U_PWM_L, V_PWM_H, V_PWM_L, W_PWM_H, and W_PWM_L are high level, the corresponding SW 21 to 26 turn on, and if the PWM signals U_PWM_H, U_PWM_L, V_PWM_H, V_PWM_L, W_PWM_H, and W_PWM_L are low level, the corresponding SW 21 to 26 turn off.

The abnormality detection unit 69 performs abnormality detection on the basis of the current detection values IA, IB, and the pseudo neutral point voltage Vn. The details of the abnormality detection will be described later.

Returning to FIG. 2, the drive circuit unit 70 includes an inverter drive circuit 600, and an abnormality check drive circuit 700.

The inverter drive circuit 600 is configured by an amplifier circuit, amplifies the PWM signals U_PWM_H, U_PWM_L, V_PWM_H, V_PWM_L, W_PWM_H, and W_PWM_L output from the microcomputer 60, and generates gate signals U_GATE_H, U_GATE_L, V_GATE_H, V_GATE_L, W_GATE_H, and W_GATE_L. The gate signal U_GATE_H is output to the SW 21, the gate signal V_GATE_H is output to the SW 22, and the gate signal W_GATE_H is output to the SW 23. Also, the gate signal U_GATE_L is output to the SW 24, the gate signal V_GATE_L is output to the SW 25, and the gate signal W_GATE_L is output to the SW 26.

The abnormality check drive circuit 700 includes a logic circuit 701, and an amplifier circuit 702.

The logic circuit 701 is a NOR circuit that outputs an abnormality check energization signal that is high level when all of the PWM signals U_PWM_H, V_PWM_H, and W_PWM_H related to the driving of the upper SW 21 to 23 are low level.

The amplifier circuit 702 amplifies the abnormality check energization signal output from the logic circuit 701, and generates a gate signal E_GATE. The generated gate signal E_GATE is output to the switch unit 51. The switch unit 51 turns on when the gate signal E_GATE is high level, and turns off when the gate signal E_GATE is low level.

In this embodiment, since the PWM signals U_PWM_H, V_PWM_H, and W_PWM_H before being amplified are input to the logic circuit 701, the logic circuit 701 can be configured by a low voltage as compared with a case in which the gate signals U_GATE_H, V_GATE_H, and W_GATE_H after being amplified are input to the logic circuit 701.

Now, a voltage vector pattern related to the driving of the motor 10 will be described.

As illustrated in FIG. 4, the voltage vector pattern has eight kinds corresponding to the combination of on/off of the SW 21 to 26. A V0 voltage vector in which all of the lower SW 24 to 26 are on, and all of the upper SW 21 to 23 are off, and a V7 voltage vector in which all of the upper SW 21 to 23 are on, and all of the lower SW 24 to 26 are off are reactive voltage vectors.

Also, the V1 voltage vector to the V6 voltage vector in which at least one of the upper SW 21 to 23, and at least one of the lower SW 24 to 26 are on are active voltage vectors. In the active voltage vector, the bus current Ic flowing into the shunt resistor 41 corresponds to a current of the phase different from the other two phases in an arm that is on.

Figure 5:
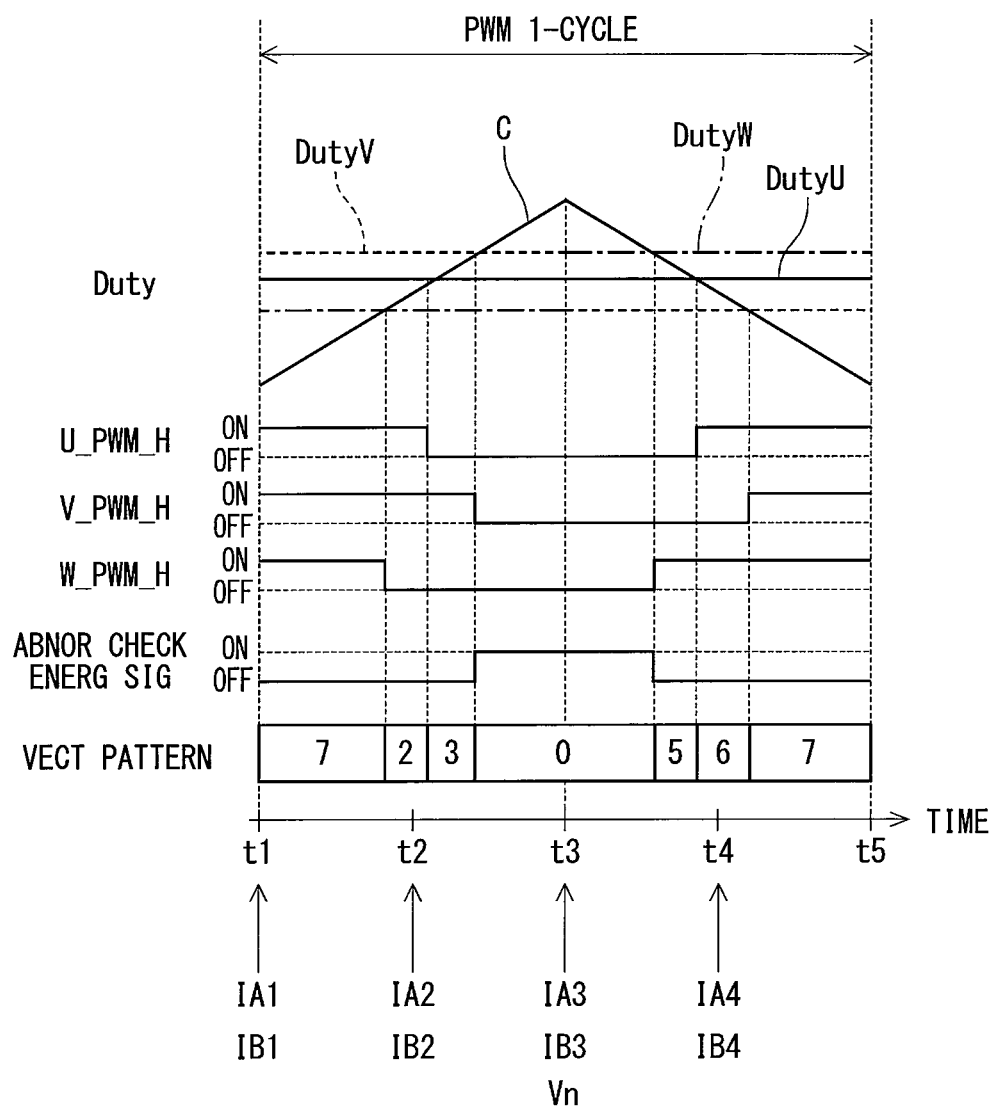
FIG. 5 is an illustrative view illustrating a current detection timing according to the first embodiment of the present disclosure.

Subsequently, a timing when the current detection values IA and IB are acquired will be described with reference to FIG. 5. In FIG. 5, the U-phase duty command value DutyU is indicated by a solid line, the V-phase duty command value DutyV is indicated by a dashed line, and the W-phase duty command value DutyW is indicated by a chain line. Also, a state in which the PWM signal is high level is indicated as "ON", and a state in which the PWM signal is low level is indicated as "OFF". The same is applied to FIGS. 9, 16, and 17 which will be described later.

In this embodiment, in one cycle of a PWM reference signal C, the current detection values IA and IB are acquired four times. Specifically, the current detection values IA and IB are acquired at a time t1 when the PWM reference signal C is at a lower end, a time t3 when the PWM reference signal C is at an upper end, a time t2 that is an intermediate timing between the time t1 and the time t3, and a time t4 that is an intermediate timing between the time t3 and a time t5 when the PWM reference signal C subsequently becomes at the lower end. In this embodiment, it is assumed that intervals between the respective times t1 to t5 are equal to each other.

Hereinafter, it is assumed that the current detection values at the time t1 are IA1 and IB1, the current detection values at the time t2 are IA2 and IB2, the current detection values at the time t3 are IA3 and IB3, and the current detection values at the time t4 are IA4 and IB4. The current detection values are also acquired at the time t5, but their illustrations are omitted from FIG. 5.

Also, at the time t3, the pseudo neutral point voltage Vn is acquired.

In the duty conversion unit 65, the duty command values DutyU, DutyV, and DutyW are appropriately corrected so that the bus current Ic2 at the time t2 and the bus current Ic4 at the time t4 can be detected as the currents of the different phases.

For example, it is assumed that the U-phase duty is Du, the V-phase duty is Dv, and the W-phase duty is Dw before correction, and the W-phase duty Dw, the U-phase duty Du, and the V-phase duty Dv are in ascending order. The duties Du, Dv, and Dw are not shown. In the example illustrated in FIG. 5, in the first half period from the time t1 to the time t3, the W-phase duty Dw is corrected downward, and the V-phase duty Dv is corrected upward. Also, in the second half period from the time t3 to the time t5, the W-phase duty Dw is corrected upward, and the V-phase duty Dv is corrected downward. In the first half period and the second half period, if the amount of correction is equal to each other, and the correction direction is opposite to each other, a voltage change caused by correction is offset on the PWM1 cycle basis.

When the PWM control is performed on the basis of the duty command values DutyU, DutyV, and DutyW corrected as described above, and the PWM reference signal C, a V2 voltage vector pattern is obtained at the time t2, and a V6 voltage vector pattern is obtained at the time t4. It is desirable that the duty command values DutyU, DutyV, and DutyW are corrected so that the time t2 and the time t4 come after the convergence of ringing, taking the ringing of current supplied to the shunt resistor 41 into account.

Also, in this embodiment, an input of the operational amplifier 43 is opposite to an input of the operational amplifier 44. For that reason, one of the current detection value IA detected by the operational amplifier 43 and the current detection value IB detected by the operational amplifier 44 is subtracted from the other, thereby being capable of offsetting an offset error of the operational amplifiers 43 and 44. If a gain is different between the operational amplifier 43 and the operational amplifier 44, the above subtraction may be performed after the respective current detection values have been appropriately multiplied by coefficients corresponding to the gains.

The calculation in the bus current calculation unit 611 will be described.

In the bus current calculation unit 611, a bus current Ic2 at the time t2, and a bus current Ic4 at the time t4 are calculated by Expressions (1) and (2).

$$Ic2=(IA2-IB2)/2 \quad (1)$$

$$Ic4=(IA4-IB4)/2 \quad (2)$$

Also, at the time t1, because a reactive voltage vector is obtained, and the switch unit 51 does not turn on, no current flows in the shunt resistor 41. Under the circumstances, the current detection values IA1 and IB1 at the time t1 are used for offset correction, and the bus current Ic2 at the time t2, and the bus current Ic4 at the time t4 may be calculated through Expressions (3) and (4).

$$Ic2=\{(IA2-IA1)-(IB2-IB1)\}/2 \quad (3)$$

$$Ic4=\{(IA4-IA1)-(IB4-IB1)\}/2 \quad (4)$$

In the phase current calculation unit 612, the respective phase currents Iu, Iv, and Iw are calculated with the use of those two bus currents Ic2 and Ic4 calculated in the bus current calculation unit 611. In the example illustrated in FIG. 5, the bus current Ic2 at the time t2 which is the V2 voltage vector period corresponds to a negative W-phase current Iw (−Iw). Also, the bus current Ic4 at the time t4 which is the V6 voltage vector period corresponds to a negative V-phase current Iv (−Iv). The U-phase current Iu is calculated by three phase sum=0 on the basis of the V-phase current Iv and the W-phase current Iw.

Subsequently, the abnormality detection in the abnormality detection unit 69 will be described.

First, the detection of the zero fixation abnormality by the short circuit of the shunt resistor 41 will be described.

As in this embodiment, in a configuration in which respective phase currents Iu, Iv, and Iw are detected by one shunt resistor 41, even if the configuration related to the current detection is normal, the current detection values IA and IB may become zero. For that reason, even if abnormality, for example, short circuit of the shunt resistor 41 occurs in the configuration related to the current detection, and the zero fixation abnormality which is an abnormality that the current detection values IA and IB are fixed to zero occurs, it is difficult to discriminate whether the configuration is normal or abnormal.

Under the circumstances, in this embodiment, the abnormality check energizing circuit unit 50 in which the shunt resistor 41 can be energized without passing through the inverter unit 20 in the reactive voltage vector period is provided. In this embodiment, in the V0 voltage vector period in which all of the upper SW 21 to 23 are off, the switch unit 51 turns on, and the shunt resistor 41 is energized without passing through the inverter unit 20. In this situation, if no zero fixation abnormality occurs, the current detection values IA3 and IB3 become the abnormality check current value Ir corresponding to the resistance value of the resistor 52. On the other hand, if the zero fixation abnormality occurs, the current detection values IA3 and IB3 become zero. As a result, the zero fixation abnormality can be detected.

Subsequently, the open failure detection of the lower SW 24 to 26 will be described.

In the configuration in which the respective phase currents Iu, Iv, and Iw are detected by one shunt resistor 41 disposed on the negative bus 82, if the open failure in which the lower SW 24 to 26 cannot be energized occurs, the misreading of the current occurs. Under the circumstances, in this embodiment, the pseudo neutral point voltage Vn is monitored to detect the open failure of the lower SW 24 to 26.

Figure 6A:
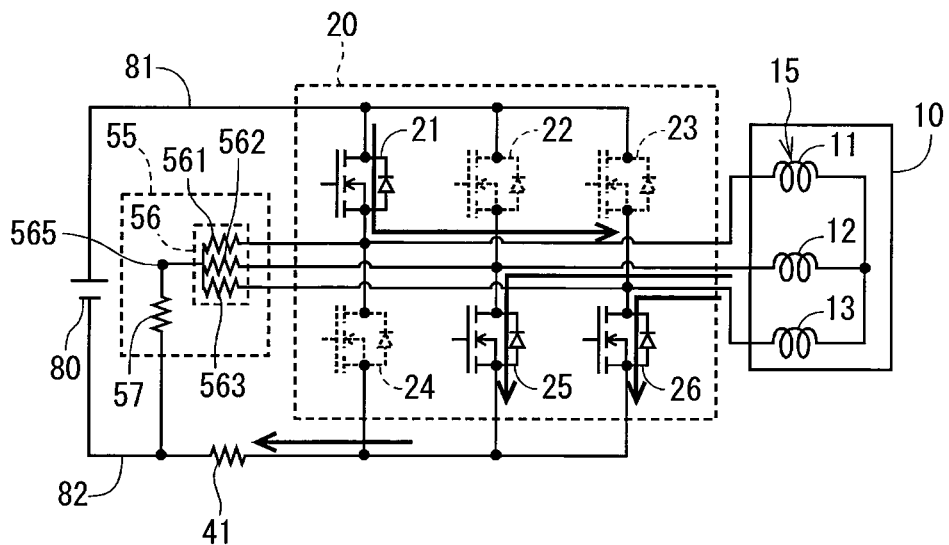
FIGS. 6A and 6B are illustrative views illustrating an energization path when a switching element is normal according to the first embodiment of the present disclosure.
Figure 6B:
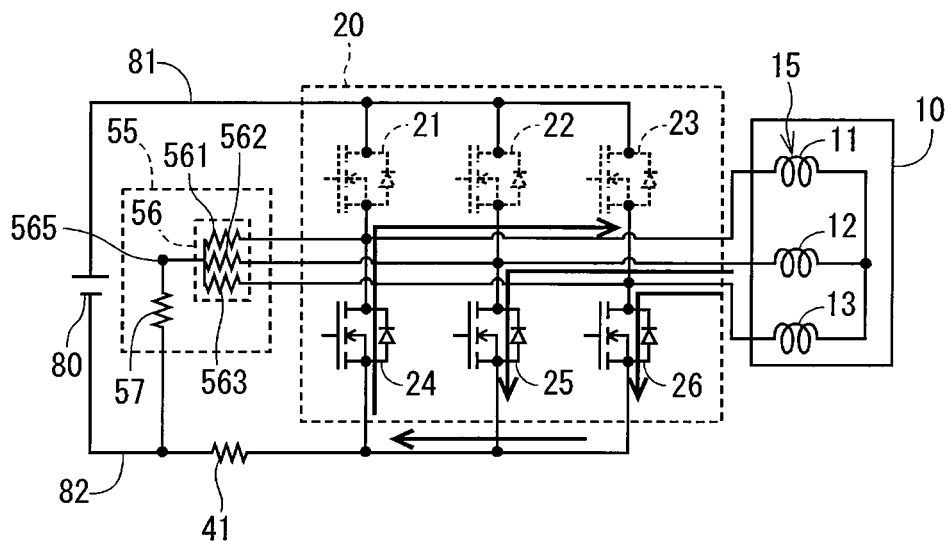
Figure 7A:
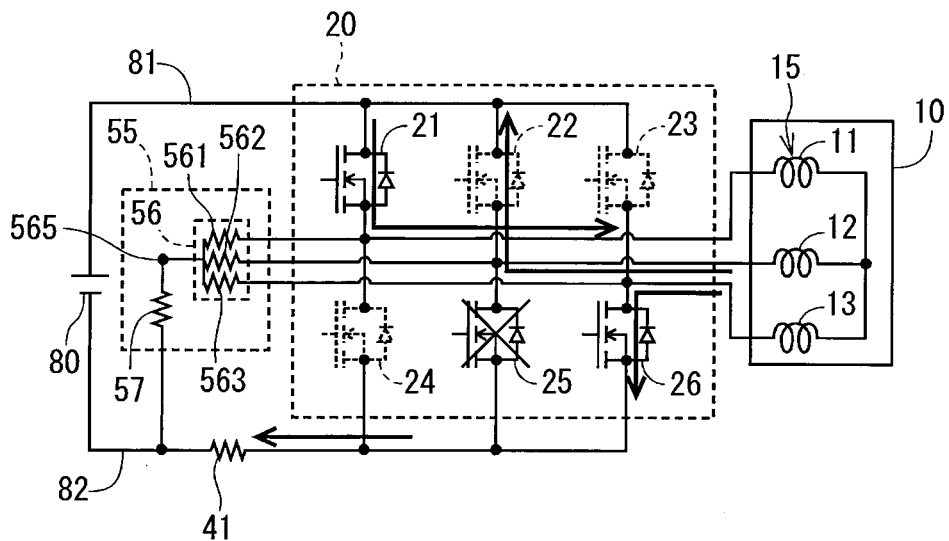
FIGS. 7A and 7B are illustrative views illustrating an energization path when an open failure occurs in the switching element according to the first embodiment of the present disclosure.
Figure 7B:
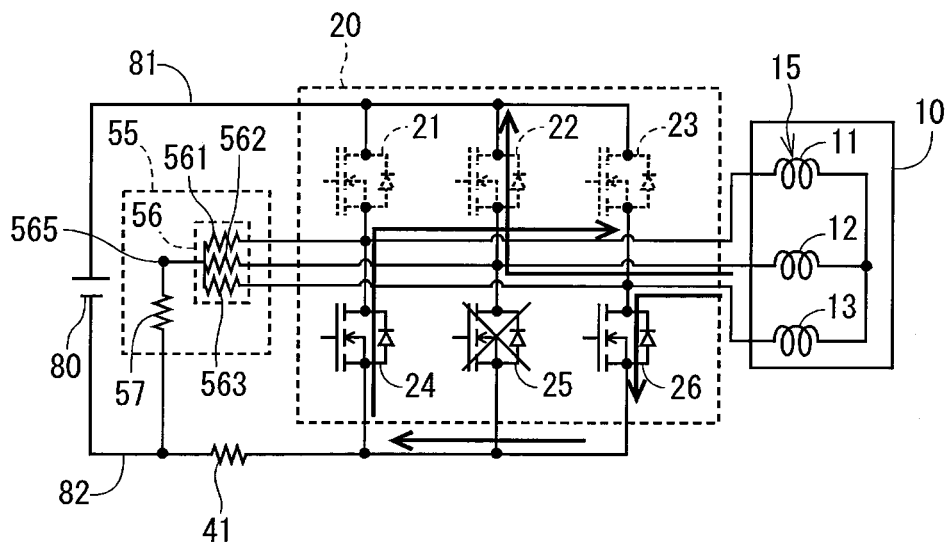

The open failure detection based on the pseudo neutral point voltage Vn will be described with reference to FIGS. 6A, 6B, and 7A, 7B. FIGS. 6A and 6B illustrate an example in which the SW 21 to 26 are normal, and FIGS. 7A and 7B illustrate an example in which the open failure occurs in the lower SW 25 with a mark X. In FIGS. 6A, 6B and 7A, 7B, FIGS. 6A and 7A illustrate a switching state in a V3 voltage vector period, and FIGS. 6B and 7B illustrate a state in which the V3 voltage vector is switched to the V0 voltage vector. In FIGS. 6A, 6B, and 7A, 7B, the SW elements that turn on are indicated by solid lines, the SW elements that turn off are indicated by dashed lines, and the configurations of the abnormality check energizing circuit unit 50 and the microcomputer 60 are omitted. Also, arrows in FIGS. 6A, 6B, and 7A, 7B denote paths in which current flows.

As illustrated in FIG. 6A, the SW 21, 25, and 26 turn on in the V3 voltage vector period. In this situation, the current flowing in the shunt resistor 41 corresponds to a U-phase current Iu(+Iu) that flows in the U-phase coil 11 from the SW 21.

When the V3 voltage vector is switched to the V0 voltage vector as illustrated in FIG. 6B, the lower SW 24 to 26 turn on. In this situation, the current that flows in the shunt resistor 41 becomes zero. Also, since each of a U-phase terminal voltage, a V-phase terminal voltage, and a W-phase terminal voltage is the ground voltage GND, the pseudo neutral point voltage Vn also becomes the ground voltage GND.

On the other hand, as illustrated in FIG. 7A, if the open failure occurs in the SW 25, the SW 21 and 26 turn on in the V3 voltage vector period. Since the SW 25 to turn on in the V3 voltage vector period does not turn on, a current flows in a diode of the SW 22 connected to the high potential side of the SW 25 in the V3 voltage vector period. For that reason, a current that flows in the shunt resistor 41 corresponds to a W-phase current Iw (−Iw) that flows into the SW 26 from the W-phase coil 13. On the other hand, in the phase current calculation unit 612, since the bus current Ic that flows in the V3 voltage vector period is assumed to correspond to the U-phase current Iu(+Iu) that flows in the U-phase coil 11 from the SW 21, the misreading of the current occurs.

Also, as illustrated in FIG. 7B, if the V3 voltage vector is switched to the V0 voltage vector, the lower SW 24 to 26 turn on. Since the SW 25 to turn on in the V0 voltage vector period does not turn on, a current continues to flow in the diode of the SW 22. In this situation, since the U-phase terminal voltage and the W-phase terminal voltage become the ground voltage GND, and the V-phase terminal voltage becomes the power supply voltage PIG, the pseudo neutral point voltage Vn becomes (PIG/3).

Therefore, the pseudo neutral point voltage Vn in the V0 voltage vector period is monitored, thereby being capable of detecting the open failure of the lower SW 24 to 26.

In this example, an abnormality detection process in the abnormality detection unit 69 will be described with reference to a flowchart illustrated in FIG. 8. The abnormality detection process is executed at given intervals, for example, when an ignition power supply is on.

In a first Step S101 (hereinafter "Step" will be omitted, and merely called symbol "S"), the current detection values IA1 to IA4, and IB1 to IB4, and the pseudo neutral point voltage Vn are obtained. In this example, the gains of the operational amplifiers 43 and 44 are equal to each other. However, if the gains of the operational amplifiers 43 and 44 are different from each other, the current detection values are corrected by multiplying coefficients corresponding to the gains, and the following processing is performed on the basis of the corrected current detection values IA1 to IA4, and IB1 to IB4. Also, since the operational amplifiers 43 and 44 are connected to the shunt resistor 41 with the positive and negative opposite to each other, the current detection values IA1 to IA4, and IB1 to IB4 are equal in absolute value to each other, and different in positive and negative from each other, on the theory.

In S102, it is determined whether absolute values of the current detection values IA3 and IB3 at the time t3 fall within a given range, or not. The given range for the abnormality determination of the current detection values IA3 and IB3 takes the sensor error into account, includes the abnormality check current value Ir supplied when the switch unit 51 turns on, and is larger than a determination value X1 and smaller than a determination value X2. If it is determined that at least one of the absolute values of the current detection values IA3 and IB3 does not fall within the given range (NO in S102), it is determined that abnormality occurs, and the flow proceeds to S107. In detail, if the absolute values of the current detection values IA3 and IB3 are smaller than the determination value X1, it is determined that the zero fixation abnormality occurs. If it is determined that both of the absolute values of the current detection values IA3 and IB3 fall within the given range (YES in S102), it is determined that the zero fixation abnormality does not occur, and the flow proceeds to S103.

In S103, it is determined whether the absolute values of the current detection values IA1 and IB1 at the time t1 are lower than a determination value X3, or not. The determination value X3 is set to a value taking the offset error into account. If it is determined that at least one of the absolute values of the current detection values IA1 and IB1 is equal to or larger than the determination value X3 (NO in S103), it is determined that offset abnormality occurs, and the flow proceeds to S107.

If it is determined that both of the absolute values of the current detection values IA1 and IB1 are smaller than the determination value X3 (YES in S103), it is determined that the offset abnormality does not occur, and the flow proceeds to S104.

In S104, it is determined whether an absolute value of the sum of the current detection values IA1 and IB1 at the time t1 is lower than a determination value X4, or not, whether an absolute value of the sum of the current detection values IA2 and IB2 at the time t2 is lower than a determination value X5, or not, whether an absolute value of the sum of the current detection values IA3 and IB3 at the time t3 is lower than a determination value X6, or not, and whether an absolute value of the sum of the current detection values IA4 and IB4 at the time t4 is lower than a determination value X7, or not. The determination values X4 to X7 are set to values taking the gain errors of the operational amplifiers 43 and 44 into account. All of the determination values X4 to X7 may be identical with each other, or may be different from each other. If it is determined that at least one of the absolute value of the sum of the current detection values IA1 and IB1, the absolute value of the sum of the current detection values IA2 and IB2, the absolute value of the sum of the current detection values IA3 and IB3, and the absolute value of the sum of the current detection values IA4 and IB4 is equal to or larger than the corresponding determination values X4 to X7 (NO in S104), it is determined that the gain error abnormality of the operational amplifiers 43 and 44 occurs, and the flow proceeds to S107. If it is determined that the absolute value of the sum of the current detection values IA1 and IB1, the absolute value of the sum of the current detection values IA2 and IB2, the absolute value of the sum of the current detection values IA3 and IB3, and the absolute value of the sum of the current detection values IA4 and IB4 are smaller than the corresponding determination values X4 to X7 (YES in S104), it is determined that the gain error abnormality of the operational amplifiers 43 and 44 does not occur, and the flow proceeds to S105.

In S105, it is determined whether the pseudo neutral point voltage Vn is smaller than a determination value X8, or not. The determination value X8 is set to a value close to (PIG/3) taking an error into account. If it is determined that the pseudo neutral point voltage Vn is equal to or larger than the determination value X8 (NO in S105), it is determined that the open failure occurs in at least one of the lower SW 24 to 26, and the flow proceeds to S107. If it is determined that the pseudo neutral point voltage Vn is smaller than the determination value X8 (YES in S105), it is determined that no open failure occurs in the lower SW 24 to 26, and the flow proceeds to S106.

In S106 to which the flow shifts when an affirmative determination is made in S102 to S105, it is determined that the current detection values IA and IB are normal.

In S107 to which the flow shifts when a negative determination is made in any one of S102 to S105, it is determined that the abnormality occurs in the current detection values IA and IB, and a stop process is performed. In the stop process, SW 21 to 26, the switch unit 51, and a power supply relay not shown turn off.

As a result, the zero fixation abnormality, the offset abnormality, and the gain error abnormality of the current detection values IA and IB caused by short circuit of the shunt resistor 41 can be detected on the basis of the current detection values IA and IB. Also, the open failure of the lower SW 24 to 26 can be detected on the basis of the pseudo neutral point voltage Vn.

As described above in detail, the power conversion device 1 includes the inverter unit 20, the current detection unit 40, the abnormality check energizing circuit unit 50, the microcomputer 60, and the drive circuit unit 70.

The inverter unit 20 includes the upper SW 21 to 23 connected to the high potential side, the lower SW 24 to 26 connected to the low potential side, and converts a current supplied to the motor 10.

The current detection unit 40 includes the shunt resistor 41 disposed on at least one of the positive bus 81 that connects the upper SW 21 to 23 and the battery 80, and the negative bus 82 that connects the lower SW 24 to 26 and the negative side of the battery 80. In this embodiment, the shunt resistor 41 is disposed on the negative bus 82.

The abnormality check energizing circuit unit 50 can energize or supply the current to the shunt resistor 41 without passing through the inverter unit 20.

The microcomputer 60 acquires the current detection values IA and IB from the current detection unit 40. Also, the microcomputer 60 and the drive circuit unit 70 control the inverter unit 20 and the abnormality check energizing circuit unit 50.

The abnormality check energizing circuit unit 50 energizes the shunt resistor 41 if all of the upper SW 21 to 23 are off, or if all of the lower SW 24 to 26 are off. In this embodiment, if all of the upper SW 21 to 23 are off, the abnormality check energizing circuit unit 50 energizes the shunt resistor 41.

If the current detection unit 40 is disposed on the positive bus 81 or the negative bus 82, the current detection values IA and IB when the current detection unit 40 is energized through the inverter unit 20 may be zero even in the normal state. For that reason, it cannot be discriminated whether the zero fixation abnormality occurs, or not.

Under the circumstances, the power conversion device 1 according to this embodiment includes the abnormality check energizing circuit unit 50 that can energize the shunt resistor 41 without passing through the inverter unit 20 in the reactive voltage vector period. If the current detection unit 40 is energized through the abnormality check energizing circuit unit 50 in the reactive voltage vector period, if no zero fixation abnormality occurs in the current detection unit 40, the current detection values IA and IB become the abnormality check current value Ir, and if the zero fixation abnormality occurs, the current detection values IA and IB become zero.

Therefore, the zero fixation abnormality of the current detection unit 40 can be detected on the basis of the current detection values IA and IB when the shunt resistor 41 is energized through the abnormality check energizing circuit unit 50 in the reactive voltage vector period. As a result, the abnormality of the current detection values IA and IB can be appropriately detected.

The microcomputer 60 controls the on/off operation of the upper SW 21 to 23 and the lower SW 24 to 26 on the basis of the PWM reference signal C, and the duty command values DutyU, DutyV, and DutyW. Also, the microcomputer 60 generates at least one of the state in which all of the upper SW 21 to 23 are off, and the state in which all of the lower SW 24 to 26 are off in the given cycle having one or more PWM reference signals C. The current detection unit 40 is energized through the abnormality check energizing circuit unit 50 in the period where all of the upper SW 21 to 23 are off, or in the period where all of the lower SW 24 to 26 are off, thereby being capable of detecting the zero fixation abnormality in every given cycle (one cycle in this embodiment) of the PWM reference signal C.

The microcomputer 60 acquires the current detection values IA and IB at timing when the shunt resistor 41 is energized through the abnormality check energizing circuit unit 50, and at timing when one or more of the upper SW 21 to 23 and the lower SW 24 to 26 are on, in a state where all of the upper SW 21 to 23 are off, or a state where all of the lower SW 24 to 26 are off, in the given cycle of the PWM reference signal C.

In this embodiment, the abnormality detection is performed on the basis of the current detection values IA3 and IB3 acquired at timing when the current detection unit 40 is energized in a state where all of the upper SW 21 to 23 are off, in one cycle of the PWM reference signal C. Also, the respective phase currents Iu, Iv, and Iw are calculated on the basis of the current detection values IA2 and IB2, IA4, and IB4 acquired at the timing when one or more of the upper SW 21 to 23, and one or more of the lower SW 24 to 26 are on.

As a result, the respective phase currents Iu, Iv, and Iw can be calculated, and the zero fixation abnormality of the current detection values IA and IB can be detected, in the given cycle of the PWM reference signal C.

Also, the microcomputer 60 acquires the current detection values IA and IB at timing when the shunt resistor 41 is not energized through the abnormality check energizing circuit unit 50 in a state where all of the upper SW 21 to 23 are off, or a state where all of the lower SW 24 to 26 are off. In this embodiment, the current detection values IA1 and IB1 acquired at timing when the current detection unit 40 is not energized in a state where all of the lower SW 24 to 26 are off are used for offset correction.

As a result, the offset correction can be performed with the use of the current detection values IA1 and IB1 in the calculation of the respective phase currents Iu, Iv, and Iw. Also, the offset abnormality can be detected.

In this embodiment, the microcomputer 60 can acquire the plural current detection values IA and IB at the same timing. More specifically, the current detection unit 40 includes one shunt resistor 41, and the plural operational amplifiers 43 and 44. Also, the operational amplifiers 43 and 44 amplify voltages between both ends thereof detected by the shunt resistor 41, and output the voltages to the microcomputer 60 as the current detection values IA and IB.

Also, the current detection values IA and IB output from the operational amplifiers 43 and 44 are different in positive and negative from each other. The respective phase currents Iu, Iv, and Iw are calculated with the use of the current detection values IA and IB different in positive and negative from each other, thereby being capable of offsetting the offset error of the operational amplifiers 43 and 44.

The microcomputer 60 has the abnormality detection unit 69 that detects the abnormality of the current detection values IA and IB on the basis of the current detection values IA and IB. In particular, the abnormality detection unit 69 detects the zero fixation abnormality on the basis of the current detection values IA3 and IB3 when the current detection unit 40 is energized through the abnormality check energizing circuit unit 50 in the state where all of the upper SW 21 to 23 are off. Also, the abnormality detection unit 69 detects the offset abnormality of the current detection values IA and IB, or the gain error abnormality. As a result, the abnormality of the current detection values IA and IB can be appropriately detected.

The power conversion device 1 includes the resistor group 56 having one end connected to the connection points 27 to 29 of the upper SW 21 to 23 and the lower SW 24 to 26, and the other end connected to the connecting unit 565 connected to the positive bus 81 or the negative bus 82. In this embodiment, the connecting unit 565 is connected to the negative bus 82 which is a side at which the shunt resistor 41 is disposed.

The microcomputer 60 has the abnormality detection unit 69 that detects the open failure in which the lower SW 24 to 26 cannot turn on, on the basis of the pseudo neutral point voltage Vn which is a voltage of the connecting unit 565.

If the open failure occurs in the lower SW 24 to 26, since the pseudo neutral point voltage Vn in the V0 voltage vector period becomes a value different from that when no open failure occurs, the abnormality detection unit 69 detects the open failure of the lower SW 24 to 26 on the basis of the pseudo neutral point voltage Vn. As a result, the misreading of the bus current Ic corresponding to the current detection values IA and IB can be avoided.

The electric power steering device 100 includes the power conversion device 1, and the motor 10 that outputs the assist torque for assisting the steering by the driver. The motor 10 according to this embodiment is a three-phase motor. Since the power conversion device 1 according to this embodiment can appropriately detect the abnormality of the current detection values IA and IB, the power conversion device 1 can avoid an unintended behavior of the motor 10 controlled on the basis of the current detection values IA and IB where abnormality occurs, and therefore can prevent the assist torque having uncomfortable feeling in the driver from being output.

In this embodiment, the abnormality detection unit 69 configures "abnormality detection unit", and "open failure detection unit". Also, S102 to S104 in FIG. 8 correspond to the processing as a function of the abnormality detection unit, and S105 corresponds to the processing as the function of "open failure detection unit".

(Second Embodiment)

Figure 9:
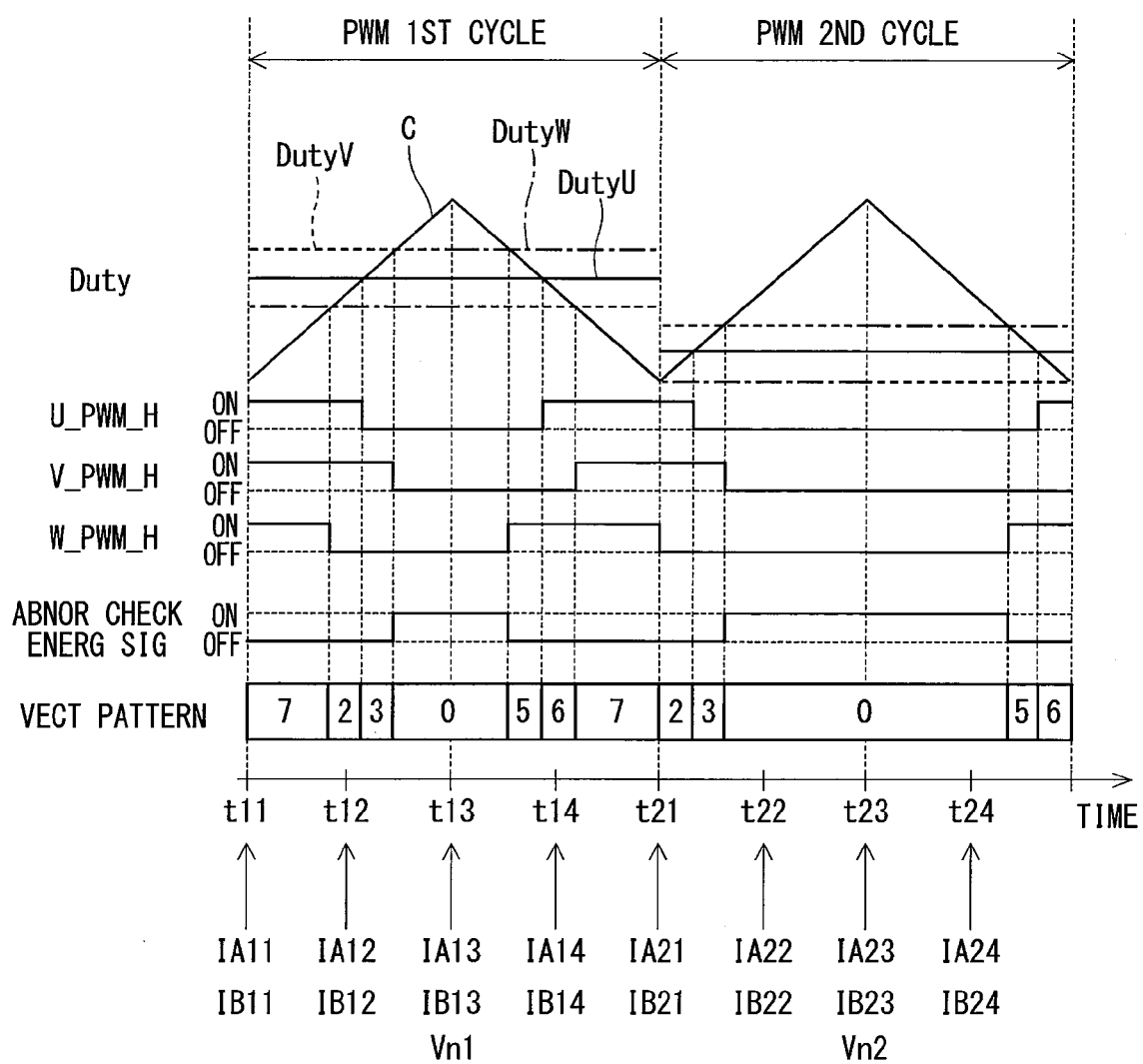
FIG. 9 is an illustrative view illustrating a current detection timing according to a second embodiment of the present disclosure.

A second embodiment of the present disclosure will be described below with reference to FIGS. 9 and 10.

In the first embodiment, the current detection and the abnormality detection are performed in the PWM1 cycle. In this embodiment, the respective phase currents Iu, Iv, and Iw are calculated on the basis of the current detection values IA and IB in a first cycle of the PWM, and the abnormality detection is performed on the basis of the current detection values IA and IB of a second cycle, and the pseudo neutral point voltage Vn.

A timing when the current detection values IA and IB are acquired will be described with reference to FIG. 9.

The current detection timing according to this embodiment is identical with that in the above embodiment, and the current detection values IA and IB are acquired at times t11, t12, t13, and t14 of the PWM1 cycle, and times t21, t22, t23, and t24 of the PWM2 cycle.

Hereinafter, it is assumed that the current detection values at the time t11 are IA11 and IB11, the current detection values at the time t12 are IA12 and IB12, the current detection values at the time t13 are IA13 and IB13, and the current detection values at the time t14 are IA14 and IB14. Also, it is assumed that the current detection values at the time t21 are IA21 and IB21, the current detection values at the time t22 are IA22 and IB22, the current detection values at the time t23 are IA23 and IB23, and the current detection values at the time t24 are IA24 and IB24. Also, at the times t13 and t23, the pseudo neutral point voltages Vn1 and Vn2 are acquired.

In the duty conversion unit 65, the duty command values DutyU, DutyV, and DutyW of the first cycle are corrected so that the bus current Ic12 at the time t12 and the bus current Ic14 at the time t14 can be detected as the currents of the different phases. The duty command values DutyU, DutyV, and DutyW of the first cycle are identical with the duty command values DutyU, DutyV, and DutyW of the first embodiment.

In the bus current calculation unit 611, a bus current Ic12 at the time t12 is calculated with the use of current detection values IA12 and IB12 through Expression (5), and a bus current Ic14 at the time t14 is calculated with the use of current detection values IA14 and IB14 through Expression (6).

$$Ic12=(IA12-IB12)/2 \qquad (5)$$

$$Ic14=(IA14-IB14)/2 \qquad (6)$$

The calculation in the phase current calculation unit 612 is identical with that in the above embodiment.

Also, in the duty conversion unit 65, in order to ensure a long time for conducting the abnormality check, a neutral point voltage in the second cycle changes. Specifically, a modulation process for changing the duty command values DutyU, DutyV, and DutyW is performed so that DutyMIN which is a duty command value of the smallest phase becomes a given lower limit value. In an example of FIG. 9, the DutyMIN in the first half period is a W-phase duty command value DutyW, and the DutyMIN in the second half period is a V-phase duty command value DutyV. Also, in FIG. 9, the modulation is performed so that the duty command value DutyMIN of the smallest phase becomes zero. However, a given lower limit value is not limited to zero, and may be set to a value other than zero, for example, taking a dead time into account.

With the above modulation processing, a V7 voltage vector in which all of the lower SW 24 to 26 are off is not generated in the second cycle. As a result, since the V0 voltage vector period becomes longer, the longer energization time of the shunt resistor 41 by the abnormality check energizing circuit unit 50 can be ensured.

In this example, an abnormality detection process in this embodiment will be described with reference to a flowchart illustrated in FIG. 10.

In S201, the current detection values IA11 to IA14, IA21 to IA24, IB11 to IB14, and IB21 to IB24, and the pseudo neutral point voltages Vn1 and Vn2 are acquired. In this example, only a value used for abnormality detection may be acquired from the current detection values IA11 to IA14, IA21 to IA24, IB11 to IB14, and IB21 to IB24.

In S202, it is determined whether absolute values of the current detection values IA23 and IB23 at the time t23 fall within a given range, or not. The given range for abnormality determination is identical with that in S102 of FIG. 8. If it is determined that at least one of the absolute values of the current detection values IA23 and IB23 does not fall within the given range (NO in S202), it is determined that abnormality occurs, and the flow proceeds to S206. In detail, if the absolute values of the current detection values IA23 and IB23 are smaller than the determination value X1, it is determined that the zero fixation abnormality occurs. If it is determined that both of the absolute values of the current detection values IA23 and IB23 fall within the given range (YES in S202), it is determined that the zero fixation abnormality does not occur, and the flow proceeds to S203.

In S203, it is determined whether an absolute value of the sum of the current detection values IA12 and IB12 at the time t12 used for calculation of the bus current Ic12 is lower than a determination value X5, or not, whether an absolute value of the sum of the current detection values IA14 and 1 B14 at the time t14 used for calculation of the bus current Ic14 is lower than a determination value X7, or not, and whether an absolute value of the sum of the current detection values IA23 and 1 B23 at the time t23 used for the zero fixation determination is lower than a determination value X6, or not. The determination values X5 to X7 are identical with those in S104 of FIG. 8. If it is determined that at least one of the absolute value of the sum of the current detection values IA12 and IB12, the absolute value of the sum of the current detection values IA14 and IB14, and the absolute value of the sum of the current detection values IA23 and IB23 is equal to or larger than the corresponding determination values X5 to X7 (NO in S203), it is determined that the gain error abnormality of the operational amplifiers 43 and 44 occurs, and the flow proceeds to S206. If it is determined that the absolute value of the sum of the current detection values IA12 and IB12, the absolute value of the sum of the current detection values IA14 and IB14, and the absolute value of the sum of the current detection values IA23 and IB23 are smaller than the corresponding determination values X5 to X7 (YES in S203), it is determined that the gain error abnormality of the operational amplifiers 43 and 44 does not occur, and the flow proceeds to S204.

In S204, it is determined whether the pseudo neutral point voltage Vn2 is smaller than a determination value X8, or not. The determination value X8 is identical with that in S105 of FIG. 8. If it is determined that the pseudo neutral point voltage Vn2 is equal to or larger than the determination value X8 (NO in S204), it is determined that the open failure occurs in at least one of the lower SW 24 to 26, and the flow proceeds to S206. If it is determined that the pseudo neutral point voltage Vn2 is smaller than the determination value X8 (YES in S204), the flow proceeds to S205. In S204, the pseudo neutral point voltage Vn2 at the time t23 may be replaced with the pseudo neutral point voltage Vn1 at the time t13. Also, both of the pseudo neutral point voltages Vn1 and Vn2 may be used.

Figure 8:
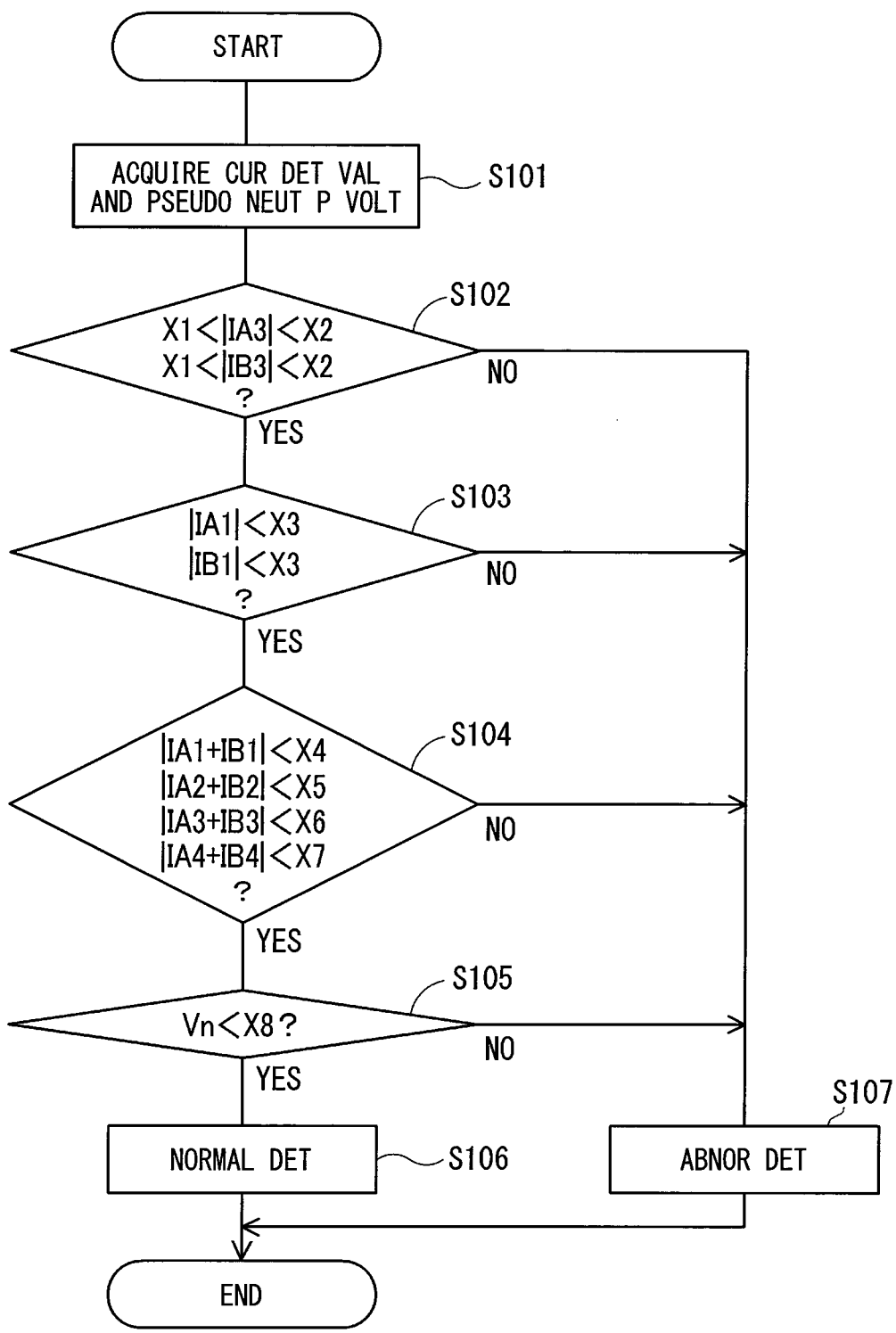
FIG. 8 is a flowchart illustrating an abnormality detection process according to the first embodiment of the present disclosure.

S205 and S206 are identical with S106 and S107 in FIG. 8.

In this embodiment, the voltage vector pattern is switched at the times t11 and t21. For that reason, the current detection values IA11 and IB11 detected at the time t11, and the current detection values IA21 and IB21 detected at the time t21 are not used for offset correction, taking a fact that those detection values are affected by ringing, etc., into account.

Also, in order to perform the offset correction, the duty DutyMIN of the smallest phase may be set to provide a V7 voltage vector interval of the degree that can detect the values of the current detection values IA11 and IB11. In this case, the bus currents Ic12 and Ic14 may be calculated as represented by Expressions (7) and (8).

$$Ic12=\{(IA12-IA11)-(IB12-IB11)\}/2 \quad (7)$$

$$Ic14=\{(IA14-IA11)-(IB14-IB11)\}/2 \quad (8)$$

Also, as with the above embodiment, the abnormality determination for the current detection values IA11 and IB12 may be performed.

In this embodiment, the abnormality detection is performed on the basis of the current detection values IA23 and IB23 acquired at timing when the shunt resistor 41 is energized through the abnormality check energizing circuit unit 50 in a state where all of the upper SW 21 to 23 are off, in the second cycle of two cycles of the PWM reference signal C. Also, the respective phase currents Iu, Iv, and Iw are calculated on the basis of the current detection values IA12 and IB12, IA14, and IB14 acquired at the timing when one or more of the upper SW 21 to 23, and one or more of the lower SW 24 to 26 are on in the first cycle.

As a result, the respective phase currents Iu, Iv, and Iw can be calculated, and the zero fixation abnormality of the current detection values IA and IB can be detected, in every two cycles of the PWM reference signal C.

Also, the microcomputer 60 generates one of the state in which all of the upper SW 21 to 23 are off, or the state in which all of the lower SW 24 to 26 are off in at least one cycle of the plural cycles of the PWM reference signal C, and does not generate the other state. In this embodiment, the state in which all of the upper SW 21 to 23 are off is generated, and the state in which all of the lower SW 24 to 26 are off is not generated, in the second cycle.

As a result, since the V0 voltage vector period in which all of the upper SW 21 to 23 are off can be lengthened, a longer time for energizing the shunt resistor 41 by the abnormality check energizing circuit unit 50 can be ensured.

Also, the same advantages as those in the above embodiment are obtained.

(Third Embodiment)

Figure 11:
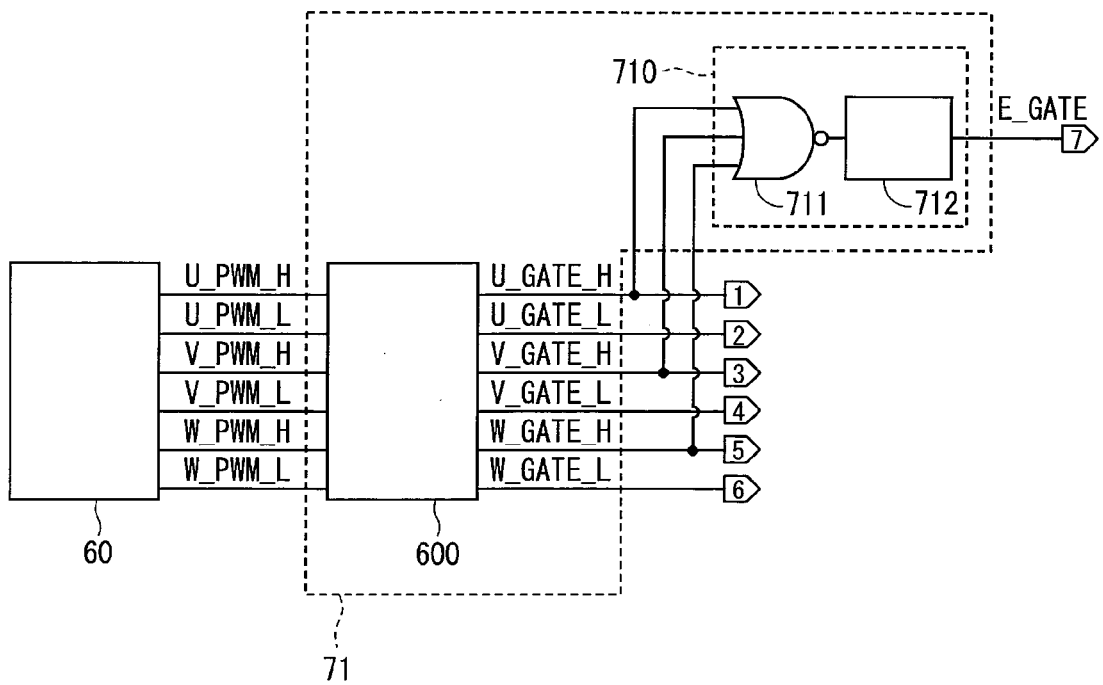
FIG. 11 is a circuit diagram illustrating a microcomputer and a drive circuit unit according to a third embodiment of the present disclosure.

A third embodiment of the present disclosure is illustrated in FIG. 11. In FIG. 11, the configuration other than the microcomputer 60 and a drive circuit unit 71 is omitted. The same is applied to FIGS. 12 to 14.

The drive circuit unit 71 includes the inverter drive circuit 600, and an abnormality check drive circuit 710.

The abnormality check drive circuit 710 includes a logic circuit 711, and an amplifier circuit 712. The logic circuit 711 is a NOR circuit that is high level when all of the gate signals U_GATE_H, V_GATE_H, and W_GATE_H related to the driving of the upper SW 21 to 23 are low level.

The amplifier circuit 712 is identical with the amplifier circuit 702 in the above embodiment.

In this embodiment, the abnormality of the gate signals U_GATE_H, V_GATE_H, and W_GATE_H output to the SW 21 to 23 can be directly monitored.

Also, the same advantages as those in the above embodiment are obtained even in this configuration.

In this embodiment, the microcomputer 60 and the drive circuit unit 71 configure "controller".

(Fourth Embodiment)

Figure 12:
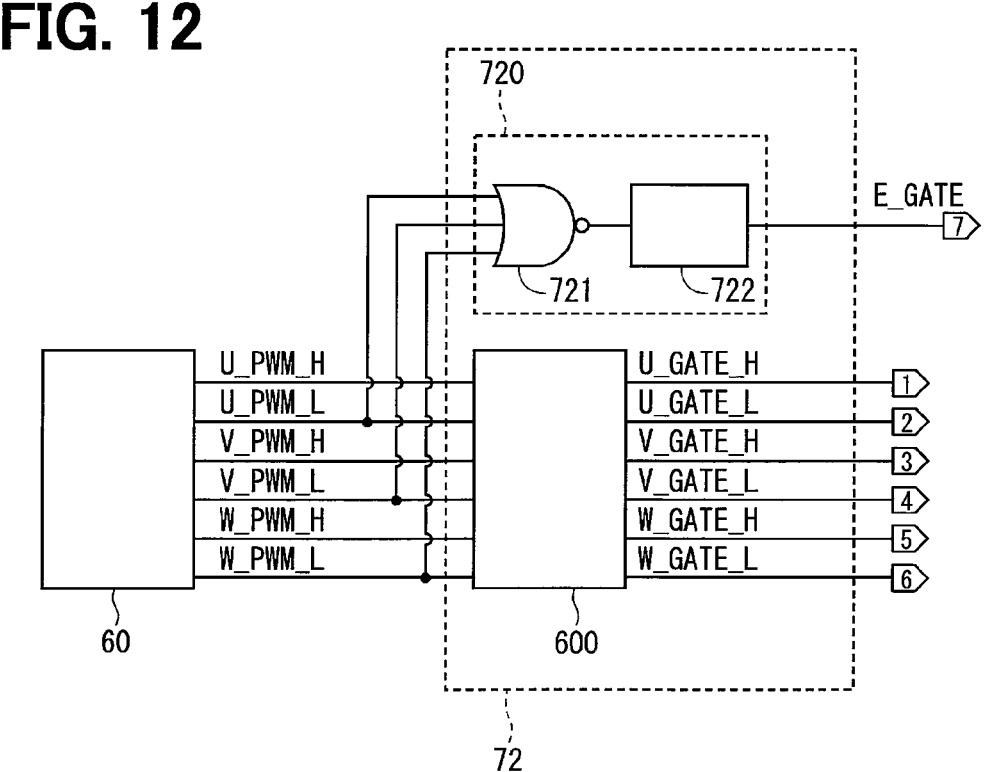
FIG. 12 is a circuit diagram illustrating a microcomputer and a drive circuit unit according to a fourth embodiment of the present disclosure.

A fourth embodiment of the present disclosure is illustrated in FIG. 12.

The drive circuit unit 72 includes the inverter drive circuit 600, and an abnormality check drive circuit 720.

The abnormality check drive circuit 720 includes a logic circuit 721, and an amplifier circuit 722. The logic circuit 721 is a NOR circuit that is high level when all of the PWM signals U_PWM_L, V_PWM_L, and W_PWM_L related to the driving of the lower SW 24 to 26 are low level, that is, in a V7 voltage vector period.

The amplifier circuit 722 is identical with the amplifier circuit 702 in the above embodiment.

Referring to the calculation in the bus current calculation unit 611, Expressions (1), (2), (5), and (6) are identical with those in the above embodiment. In Expressions (3) and (4), the current detection values IA1 and IB1 are replaced with current detection values IA3 and IB3 for offset correction. Also, in Expressions (7) and (8), the current detection values IA11 and IB11 are replaced with current detection values IA13 and IB13 for offset correction.

As illustrated in FIG. 12, in this embodiment, the switch unit 51 turns on in the V7 voltage vector period in which all of the lower SW 24 to 26 are off. When the switch unit 51 turns on, if no zero fixation abnormality occurs, since a current flows into the shunt resistor 41, the current detection values IA1 and IB1 become the abnormality check current value Ir corresponding to the resistance value of the resistor 52. On the other hand, if the zero fixation abnormality occurs, the current detection values IA1 and IB1 become zero. As a result, the zero fixation abnormality can be detected.

Referring to the abnormality detection process, in an example of FIG. 8 that performs the abnormality detection in every PWM1 cycle, in S102, it is determined whether the absolute value of the current detection values IA1 and IB1 falls within a given range, or not, instead of the current detection values IA3 and IB3. If it is determined that at least one of the absolute values of the current detection values IA1 and IB1 does not fall within the given range (NO in S102), it is determined that abnormality occurs. In detail, if the absolute values of the current detection values IA1 and IB1 are smaller than the determination value X1, it is determined that the zero fixation abnormality occurs. If it is determined that both of the absolute values of the current detection values IA1 and IB1 fall within the given range (YES in S103), it is determined that the zero fixation abnormality does not occur.

In S103, it is determined whether the absolute values of the current detection values IA3 and IB3 are lower than the determination value X3, or not. If it is determined that at least one of the absolute values of the current detection values IA3 and IB3 is equal to or larger than the determination value X3 (NO in S103), it is determined that offset abnormality occurs. If it is determined that both of the absolute values of the current detection values IA3 and IB3 are smaller than the determination value X3 (YES in S103), it is determined that the offset abnormality does not occur.

The other processing is the same as that of the first embodiment.

Also, when the abnormality detection is performed in every PWM2 cycle as in the second embodiment, in the duty conversion unit 65, in order to ensure a long time for conducting the abnormality check, a neutral point voltage in the second cycle changes. Specifically, a modulation process for changing the duty command values DutyU, DutyV, and DutyW is performed so that DutyMAX which is a duty of the largest phase becomes a given upper limit value. As a result, since the V7 voltage vector period becomes longer, the longer energization time of the shunt resistor 41 by the abnormality check energizing circuit unit 50 can be ensured.

Figure 10:
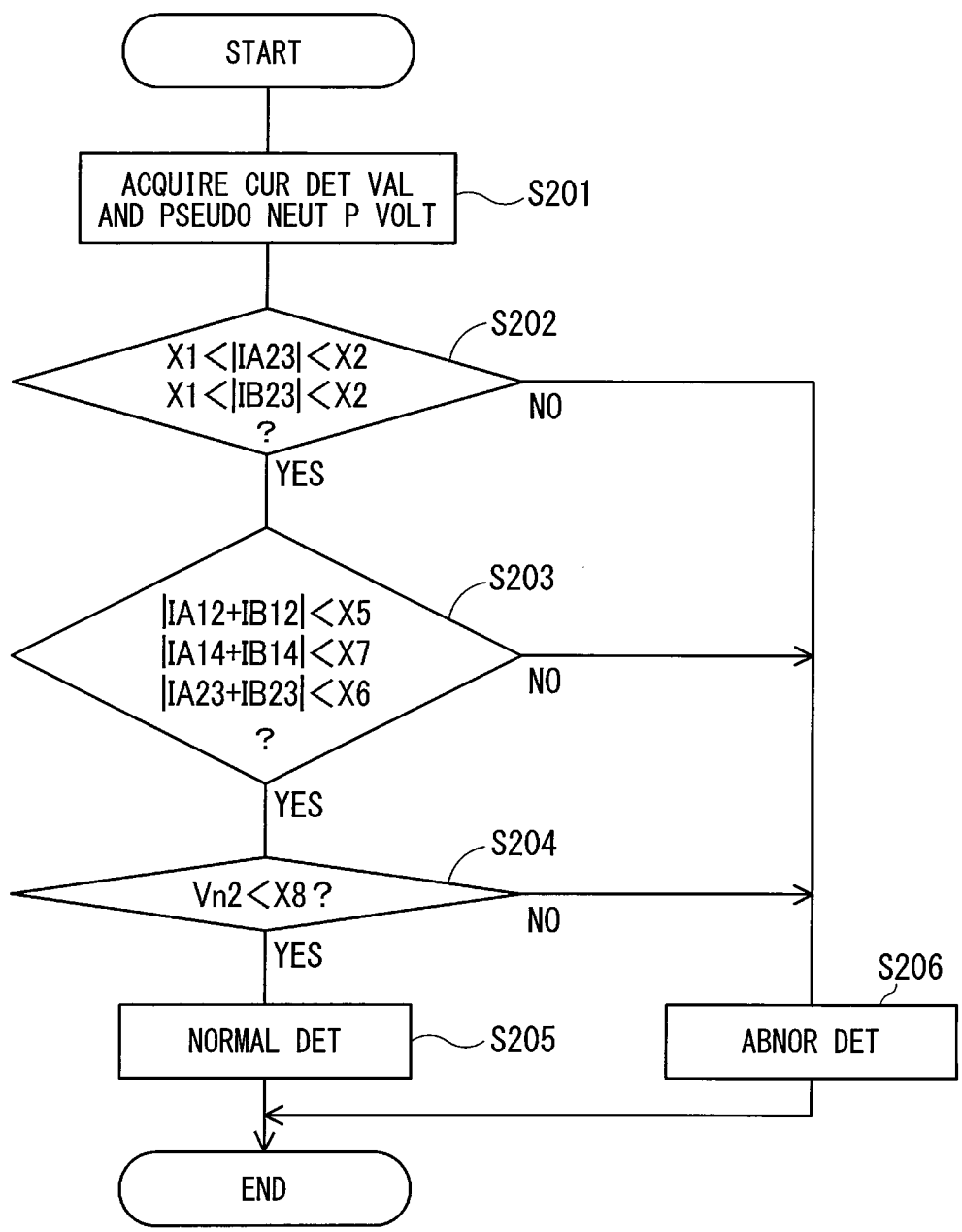
FIG. 10 is a flowchart illustrating an abnormality detection process according to the second embodiment of the present disclosure.

Referring to the flowchart, in S202 of FIG. 10, it is determined whether the absolute values of the current detection values IA21 and IB21 fall within a given range, or not, instead of the current detection values IA23 and IB23. If it is determined that at least one of the absolute values of the current detection values IA21 and IB21 does not fall within the given range (YES in S202), it is determined that abnormality occurs. In detail, if the absolute values of the current detection values IA21 and IB21 are smaller than the determination value X1, it is determined that the zero fixation abnormality occurs. If it is determined that both of the absolute values of the current detection values IA21 and IB21 fall within the given range (NO in S202), it is determined that the zero fixation abnormality does not occur.

In S203, the current detection values IA23 and IB23 are replaced with current detection values IA21 and IB21.

The other processing is the same as that of the second embodiment.

In this embodiment, the abnormality check energizing circuit unit 50 energizes the shunt resistor 41 if all of the lower SW 24 to 26 are off.

The microcomputer 60 acquires the current detection values IA and IB at timing when the shunt resistor 41 is energized through the abnormality check energizing circuit unit 50, and at timing when one or more of the upper SW 21 to 23 and one or more of the lower SW 24 to 26 are on, in a state where all of the lower SW 24 to 26 are off, in one or more of the given cycles of the PWM reference signal. Also, the current detection values IA and IB are acquired at timing when the current detection unit 40 is not energized through the abnormality check energizing circuit unit 50 in a state where all of the upper SW 21 to 23 are off.

Also, when the abnormality detection is performed in every plural cycles of PWM, in at least one cycle of the plural cycles of the PWM reference signal C, the state in which all of the lower SW 24 to 26 are off is generated, and the state in which all of the upper SW 21 to 23 are off is not generated.

Also, the same advantages as those in the above embodiment are obtained even in this configuration.

In this embodiment, the microcomputer 60 and the drive circuit unit 72 configure "controller".

(Fifth Embodiment)

Figure 13:
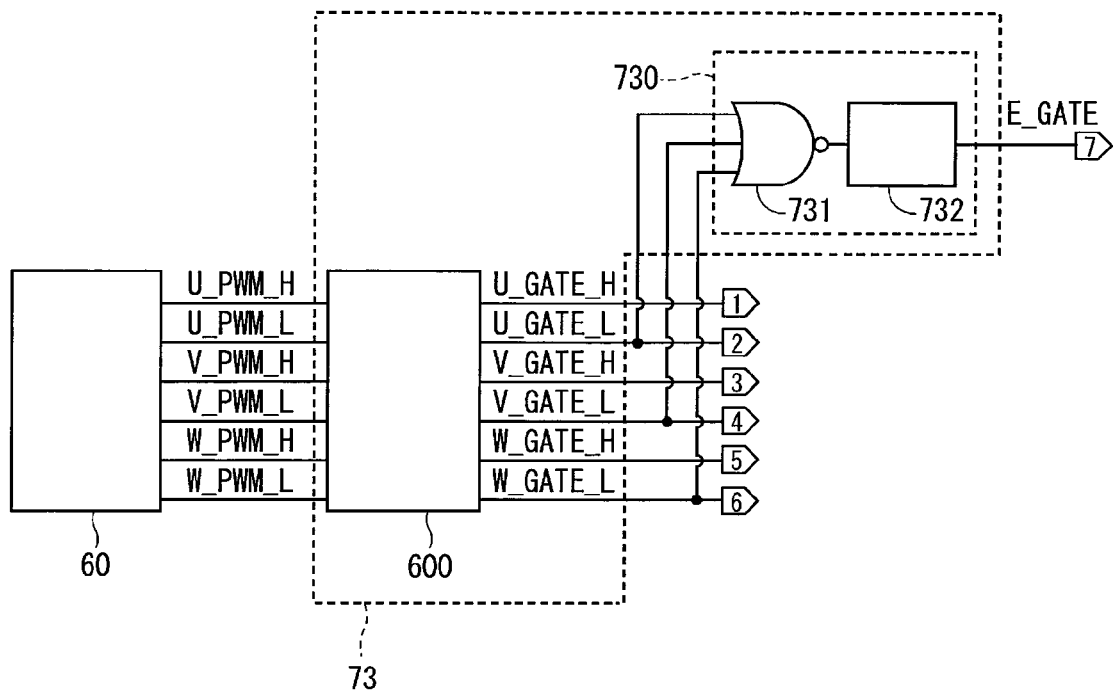
FIG. 13 is a circuit diagram illustrating a microcomputer and a drive circuit unit according to a fifth embodiment of the present disclosure.

A fifth embodiment of the present disclosure is illustrated in FIG. 13.

The drive circuit unit 73 includes the inverter drive circuit 600, and an abnormality check drive circuit 730.

The abnormality check drive circuit 730 includes a logic circuit 731, and an amplifier circuit 732. The logic circuit 731 is a NOR circuit that is high level when all of the gate signals U_GATE_L, V_GATE_L, and W_GATE_L related to the driving of the lower SW 24 to 26 are low level.

The amplifier circuit 732 is identical with the amplifier circuit 702, etc., in the above embodiment.

In this embodiment, the abnormality of the gate signals U_GATE_L, V_GATE_L, and W_GATE_L output to the SW 24 to 26 can be directly monitored.

Also, the same advantages as those in the above embodiment are obtained even in this configuration.

In this embodiment, the microcomputer 60 and the drive circuit unit 73 configure "controller".

(Sixth Embodiment)

A sixth embodiment of the present disclosure is illustrated in FIGS. 14 to 17.

Figure 14:
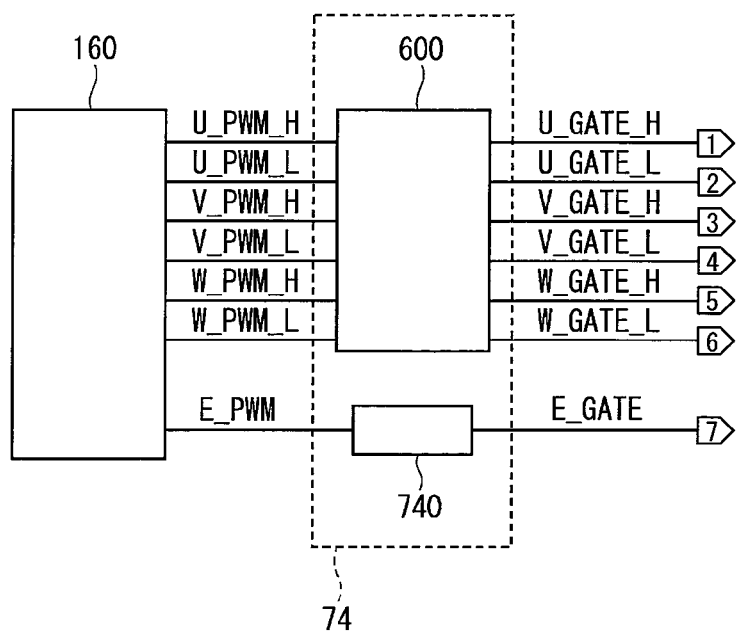
FIG. 14 is a circuit diagram illustrating a microcomputer and a drive circuit unit according to a sixth embodiment of the present disclosure.
Figure 15:
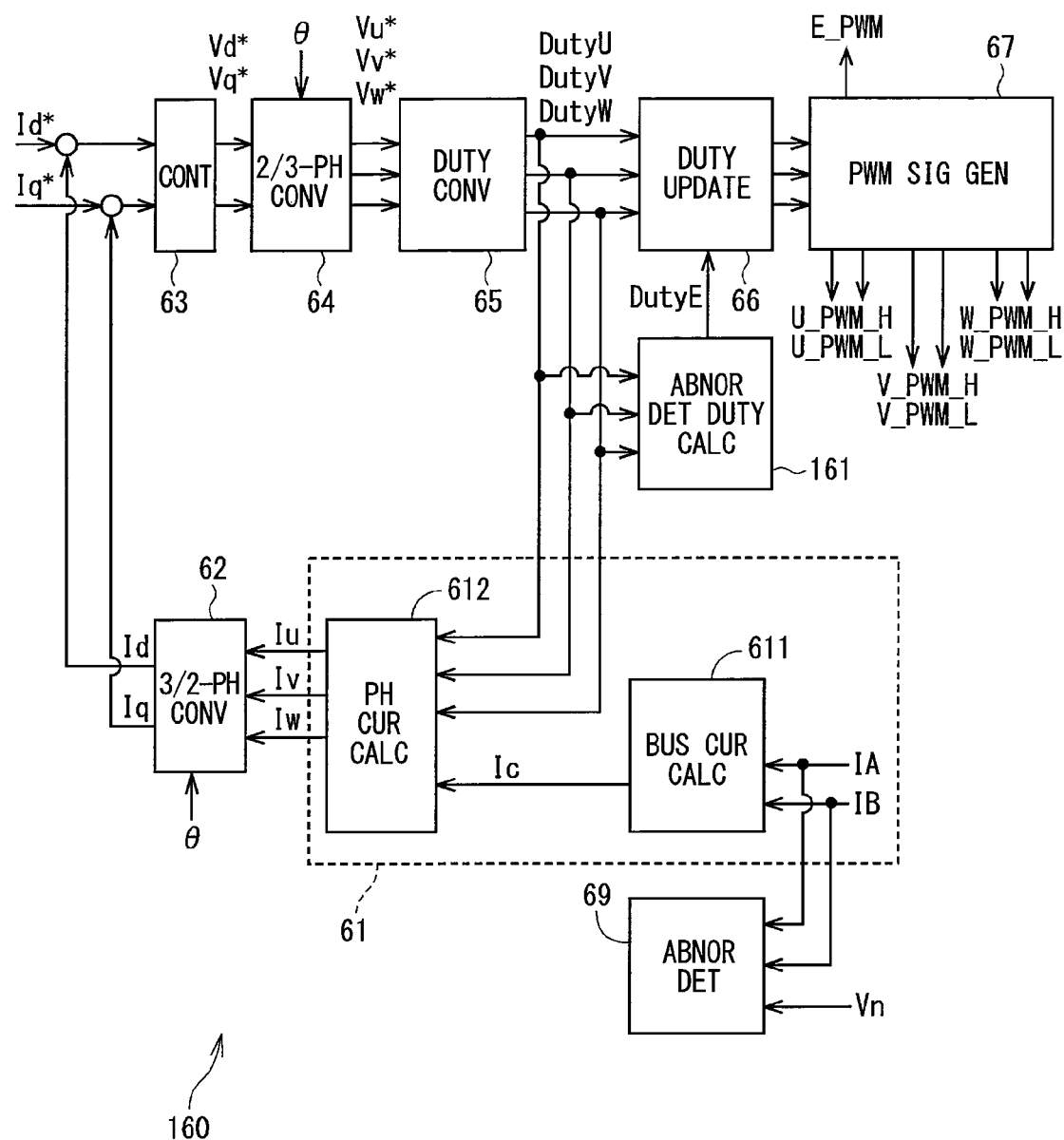
FIG. 15 is a block diagram illustrating a configuration of a microcomputer according to the sixth embodiment of the present disclosure.

As illustrated in FIGS. 14 and 15, a microcomputer 160 according to this embodiment has an abnormality detection duty calculation unit 161.

As illustrated in FIG. 15, the abnormality detection duty calculation unit 161 calculates an abnormality detection duty command value DutyE on the basis of the duty command values DutyU, DutyV, and DutyW output from the duty conversion unit 65.

When the control is made so that the switch unit 51 turns on in a state where the lower SW 24 to 26 are off, if the duty of the smallest phase is DutyMIN among the duty command values DutyU, DutyV, and DutyW, the abnormality detection duty command value DutyE is represented by Expression (9). S1 in Expression (9) is the amount of shift from the duty DutyMIN of the smallest phase.

$$DutyE = DutyMIN - S1 \qquad (9)$$

Also, when the control is made so that the switch unit 51 turns on in a state where the upper SW 21 to 23 are off, if the duty of the largest phase is DutyMAX among the duty command values DutyU, DutyV, and DutyW, the abnormality detection duty command value DutyE is represented by Expression (10). S2 in Expression (10) is the amount of shift from the duty DutyMAX of the largest phase.

$$DutyE = DutyMAX + S2 \qquad (10)$$

Figure 16:
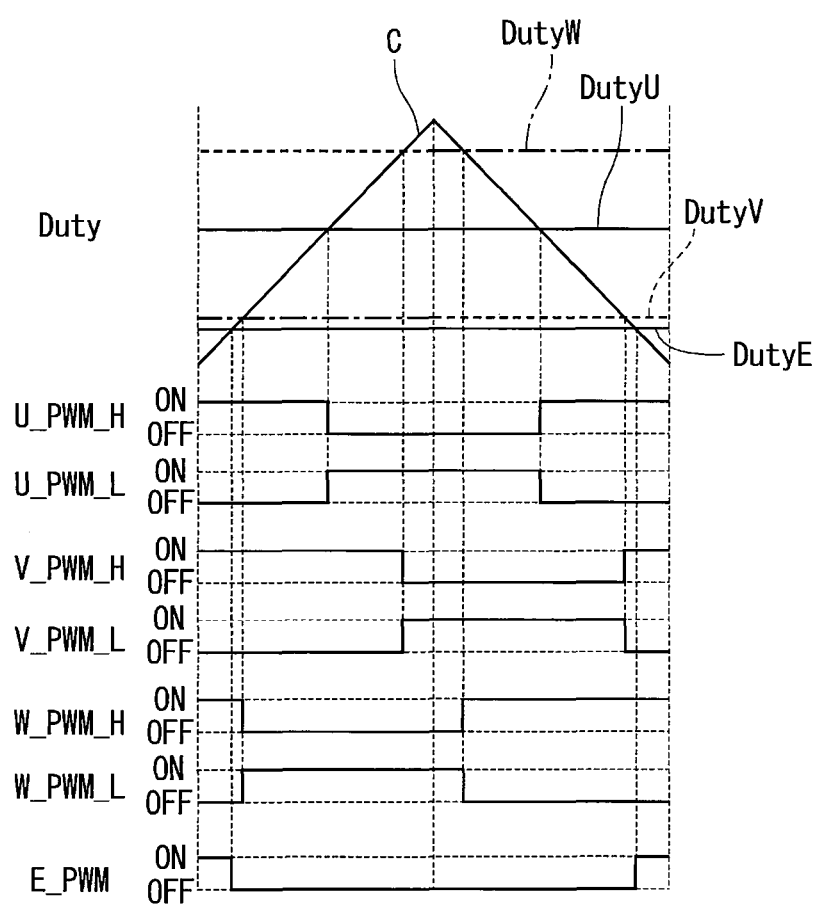
FIG. 16 is an illustrative view illustrating a duty command value according to the sixth embodiment of the present disclosure.
Figure 17:
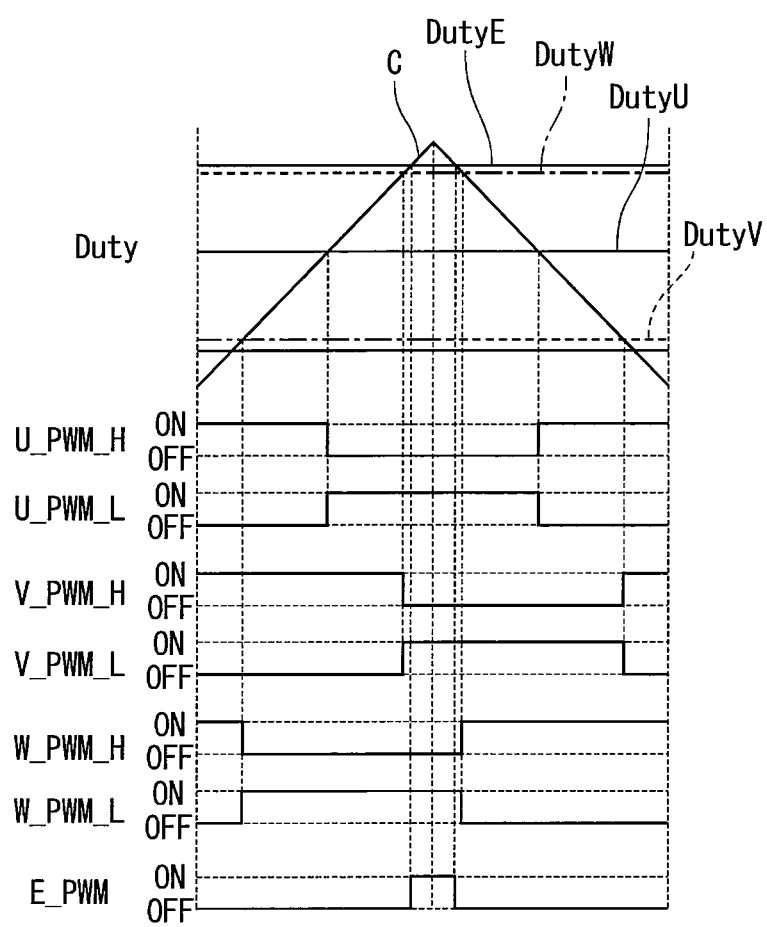
FIG. 17 is an illustrative view illustrating a duty command value according to the sixth embodiment of the present disclosure.

The example in which the control is made so that the switch unit 51 turns on in the state where the lower SW 24 to 26 are off is illustrated in FIG. 16, and the example in which the control is made so that the switch unit 51 turns on in the state where the upper SW 21 to 23 are off is illustrated in FIG. 17. FIGS. 16 and 17 illustrate cases in which the amounts of shifts S1 and S2 are positive values.

As illustrated in FIG. 16, if the amount of shift 51 is set to the positive value, the timing when the energization of the switch unit 51 starts is delayed more than the timing when all of the lower SW 24 to 26 turn off, taking ringing immediately after the on/off switching operation of the SW 21 to 26 into account.

Also, if, for example, the duty DutyMIN of the smallest phase is close to zero, the amount of shift S1 may be set to a negative value to ensure a period during the switch unit 51 turns on to the degree that can detect the current flowing into the shunt resistor 41.

Likewise, as illustrated in FIG. 17, if the amount of shift S2 is set to the positive value, the timing when the energization of the switch unit 51 starts is delayed more than the timing when all of the upper SW 21 to 23 turn off, taking ringing immediately after the on/off switching operation of the SW 21 to 26 into account.

Also, if, for example, the duty DutyMAX of the largest phase is close to the upper limit value of the duty that can output, the amount of shift S2 may be set to a negative value to ensure a period during the switch unit 51 turns on to the degree that can detect the current flowing into the shunt resistor 41.

The amounts of shifts S1 and S2 may be zero.

Returning to FIG. 15, the duty update unit 66 updates the abnormality detection duty command value DutyE in addition to the duty command values DutyU, DutyV, and DutyW.

The PWM signal generation unit 67 generates an abnormality detection PWM signal E_PWM in addition to the PWM signals U_PWM_H, U_PWM_L, V_PWM_H, V_PWM_L, W_PWM_H, and W_PWM_L. When the abnormality detection PWM signal E_PWM which is the abnormality check energization signal is high level, the switch unit 51 turns on.

The other configuration of the microcomputer 160 is identical with that of the microcomputer 60 in the above embodiment.

As illustrated in FIG. 14, a drive circuit unit 74 includes the inverter drive circuit 600, and an abnormality check drive circuit 740. The abnormality check drive circuit 740 is an amplifier circuit identical with the amplifier circuit 702 in the above embodiment, and amplifies the abnormality detection PWM signal E_PWM output from the microcomputer 160 to generate the gate signal E_GATE. The generated gate signal E_GATE is output to the switch unit 51.

In this embodiment, the microcomputer 160 and the drive circuit unit 74 configure "controller".

In this embodiment, the abnormality detection PWM signal E_PWM related to the on/off operation of the switch unit 51 is calculated by the microcomputer 160 with the use of software. For that reason, the degree of freedom of setting the abnormality detection duty command value DutyE is high.

For example, when the duty DutyMIN of the smallest phase is modulated to become a given lower limit value, the abnormality detection duty command value DutyE is calculated through Expression (10). Also, when the duty DutyMAX of the largest phase is modulated to become a given upper limit value, the abnormality detection duty command value DutyE is calculated through Expression (9). Thus, the abnormality detection duty command value DutyE is set according to the duty command values DutyU, DutyV, and DutyW, thereby being capable of appropriately detecting the abnormality.

Also, the amounts of shifts S1 and S2 are adjusted according to the duty command values DutyU, DutyV, and DutyW, thereby being capable of appropriately detecting the abnormality.

Also, for example, as in the second embodiment, current calculation used for control is performed in the first cycle, and when the abnormality is detected in the second cycle, there is no need to turn on the switch unit 51 in the first cycle. For that reason, if the abnormality detection duty command value DutyE in the first cycle is set to zero, the switch unit 51 does not turn on. As a result, since the number of energization to the abnormality check energizing circuit unit 50 can be reduced, a loss caused by abnormality check can be reduced.

Also, the same advantages as those in the above embodiment are obtained.

(Seventh Embodiment)

Figure 18:
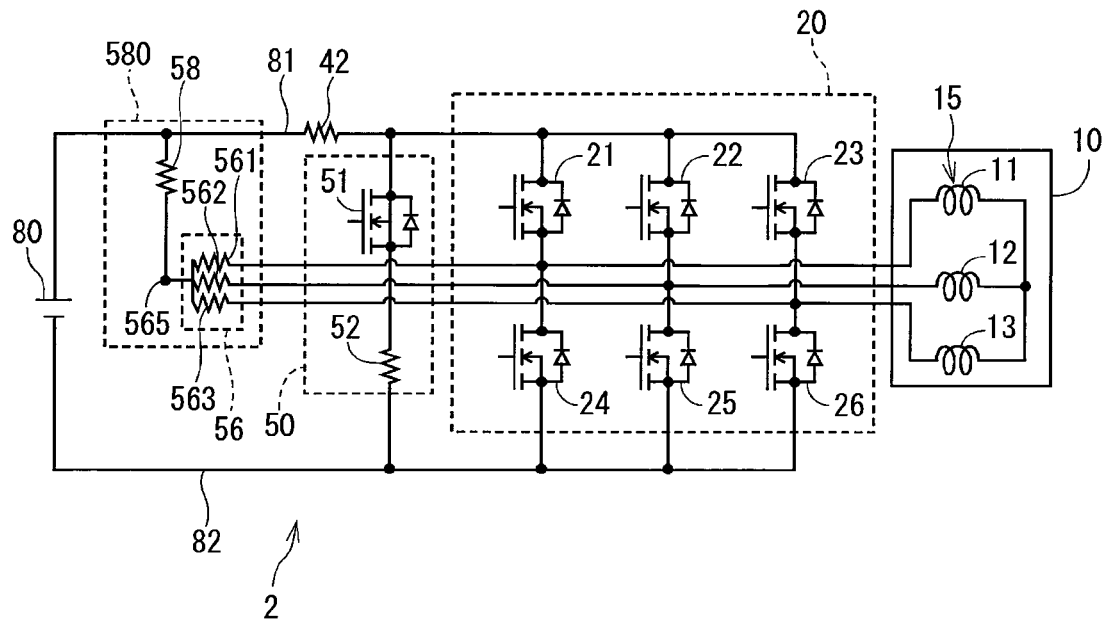
FIG. 18 is a circuit diagram illustrating a power conversion device according to a seventh embodiment of the present disclosure.

A power conversion device according to a seventh embodiment of the present disclosure is illustrated in FIG. 18. In FIG. 18, the configurations of the capacitor 30, the choke coil 31, the operational amplifiers 43 and 44, the microcomputer 60, and the drive circuit units 70 to 74 are omitted. Also, the configuration for generating the gate signal E_GATE related to the drive of the switch unit 51 may be applied with any configuration of the first to fifth embodiments. The same is applied to the seventh embodiment and an eighth embodiment which will be described later.

In a power conversion device 2 according to this embodiment, a shunt resistor 42 as a sensor is disposed between the inverter unit 20 and the battery 80, and on the positive bus 81.

Also, a pseudo neutral point voltage detection unit 580 includes the resistor group 56, and a pull-up resistor 58. The pull-up resistor 58 has one end connected to the connecting unit 565, and the other end connected to the positive bus 81 on the battery 80 side of the shunt resistor 42 side.

In this embodiment, if no open failure occurs in the upper SW 21 to 23, the pseudo neutral point voltage Vn in the V7 voltage vector period becomes the supply voltage PIG. If the open failure occurs in the upper SW 21 to 23, the pseudo neutral point voltage Vn in the V7 voltage vector period becomes (2×PIG/3). Therefore, the pseudo neutral point voltage Vn in the V7 voltage vector period is monitored, thereby being capable of detecting the open failure of the upper SW 21 to 23.

Referring to the flowchart, in S105 of FIGS. 8 and S204 of FIG. 10, it is determined whether the pseudo neutral point voltage Vn or Vn2 is larger than a determination value X9, or not, and if it is determined that the pseudo neutral point voltage Vn is equal to or lower than the determination value X9, it is determined that the open failure occurs in at least one of the upper SW 21 to 23. The determination value X9 is set to a value close to (2×PIG/3) taking an error into account.

Also, the same advantages as those in the above embodiment are obtained even in this configuration.

(Eighth Embodiment)

Figure 19:
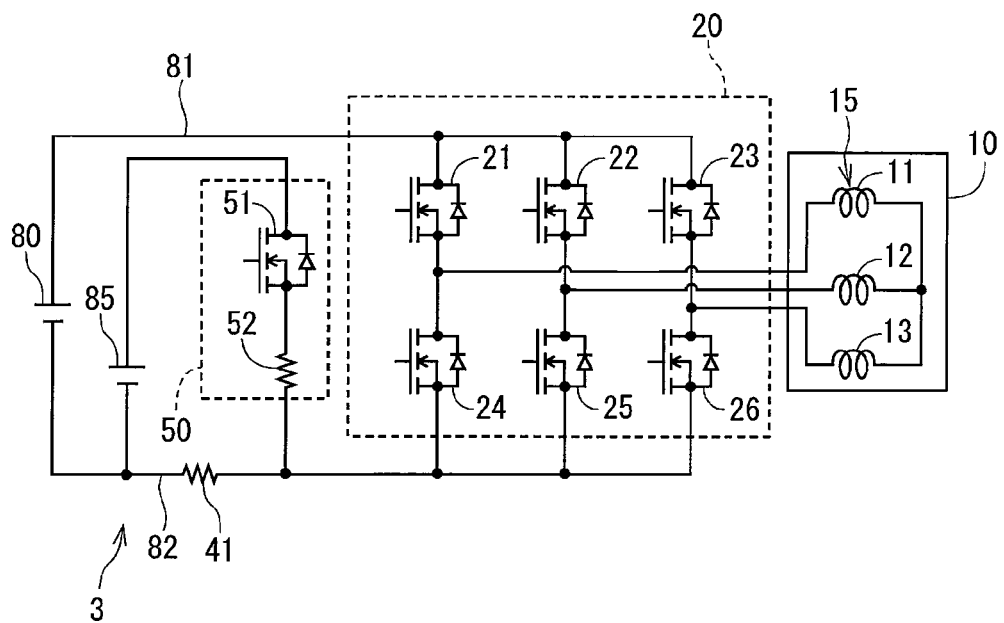
FIG. 19 is a circuit diagram illustrating a power conversion device according to an eighth embodiment of the present disclosure.

FIG. 19 illustrates a power conversion device according to an eighth embodiment of the present disclosure. In FIG. 19, the capacitor 30, the choke coil 31, the operational amplifiers 43 and 44, the pseudo neutral point voltage detection unit 55, the microcomputer 60, and the drive circuit units 70 to 74 are omitted.

A power conversion device 3 according to this embodiment includes an abnormality check power supply 85 as a second power supply that can supply an electric power of a voltage different from that of the battery 80 which supplies the electric power to the motor 10 to the abnormality check energizing circuit unit 50.

The electric power is supplied to the abnormality check energizing circuit unit 50 from the abnormality check power supply 85. As a result, because the voltage of the abnormality check power supply 85 can be set independently from the voltage of the battery 80, the current that flows in the shunt resistor 41 is easily adjusted.

Also, for example, if the abnormality check power supply 85 is an internal power supply in which the voltage supplied from the battery 80 is regulated to a given voltage by a regulator not shown, since a voltage of the abnormality check power supply 85 is stable, the noise of the current detection values IA and IB can be reduced.

(Ninth Embodiment)

Figure 20:
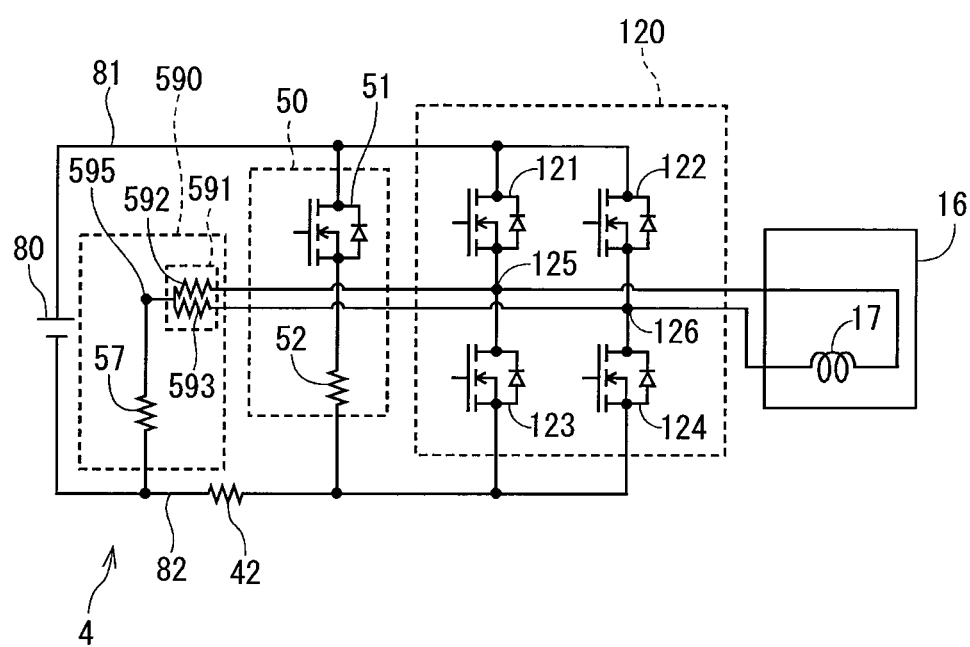
FIG. 20 is a circuit diagram illustrating a power conversion device according to a ninth embodiment of the present disclosure.

A power conversion device according to a ninth embodiment of the present disclosure is illustrated in FIG. 20. In FIG. 20, the capacitor 30, the choke coil 31, the operational amplifiers 43 and 44, the microcomputer 60, and the drive circuit units 70 to 74 are omitted.

A power conversion device 4 according to this embodiment controls the driving of a motor 16 which is a brush motor having a winding 17. In this embodiment, the motor 16 corresponds to "rotating electric machine" and "two-phase rotating electric machine".

An inverter unit 120 of the power conversion device 4 is an H-bridge circuit having SW 121 to 124. The SW 121 and 122 each have a drain connected to the positive bus 81. Also, sources of the SW 121 and 122 are connected to drains of the SW 123 and 124, respectively. Sources of the SW 123 and 124 are connected to the negative bus 82.

A winding 17 is connected between a connection point 125 between the SW 121 and the SW 123 which are paired, and a connection point 126 between the SW 122 and the SW 124 which are paired.

In this embodiment, the SW 121 and 122 correspond to "high potential side switching elements", and the SW 123 and 124 correspond to "low potential side switching elements".

A pseudo neutral point voltage detection unit 590 has a resistor group 591 and the pull-down resistor 57.

The resistor group 591 includes resistors 592 and 593. One end of the resistor 592 is connected to the connection point 125 between the SW 121 and the SW 123. One end of the resistor 593 is connected to the connection point 126 between the SW 122 and the SW 124. The other ends of the resistors 592 and 593 are connected to the connecting unit 595. In this embodiment, the connecting unit 595 is regarded as the pseudo neutral point, and the open failure of the SW 123 and 124 is detected on the basis of the pseudo neutral point voltage Vn.

Also, the same advantages as those in the above embodiment are obtained even in this configuration.

(Other Embodiments)

(a) In the embodiments except for the above seventh embodiment, the shunt resistor is disposed on the negative bus. In the other embodiments, in the configuration of the eighth embodiment and the configuration of the ninth embodiment, the shunt resistor may be disposed on the positive bus. Also, the shunt resistor may be disposed on the positive bus and the negative bus.

Further, in the above configuration, the sensor unit is configured by the shunt resistor. In the other configurations, the sensor unit may use any configuration that can detect a bus current such as a hall IC instead of the shunt resistor.

(b) In the above configurations, two operational amplifiers are provided. In the other configurations, the operational amplifiers may not be provided, or one or three or more operational amplifiers may be provided. In the above configurations, the current detection values output from the two operational amplifiers are different in positive and negative from each other. In the other configuration, if three or more operational amplifiers are provided, it is preferable that those operational amplifiers are connected to each other so that at least one value of the current detection values output from the operational amplifiers is different in positive and negative from another value. Also, in the above configuration, both of those two operational amplifiers are reverse-phase amplifiers, but in the other configuration, one operational amplifier may be a positive phase amplifier.

Also, if the offset error is sufficiently small, all of the plural operational amplifiers may be configured by reverse-phase amplifiers, and the respective operational amplifiers may be connected to each other so that the positive and negative of the current detection values output from the operational amplifiers become identical with each other.

(c) In the above configuration, the control unit acquires the current detection values by four times of a vertex of a valley side of the PWM reference signal, a vertex of a mountain side thereof, and an intermediate timing in one cycle of the PWM reference signal. In the other configuration, the number of acquiring the current detection value in one cycle of the PWM reference signal is not limited to four, but may be any times. Also, the timing at which the current detection values are acquired is not limited to the vertex of the valley side of the PWM reference signal, the vertex of the mountain side thereof, and the intermediate timing, but the current detection value may be acquired, for example, at timing delayed or advanced in given intervals from the vertex of the PWM reference signal. Also, the timing at which the current detection value is acquired may not be the given intervals.

(d) In the above configurations, the power conversion device includes the pseudo neutral point voltage detection unit. In the other configuration, the pseudo neutral point voltage detection unit may be omitted.

(e) In the above configurations, the carrier wave which is the PWM reference signal is triangle wave. In the other configuration, the PWM reference signal is not limited to the triangle wave, but may be, for example, sawtooth wave.

(f) in the above configurations, the rotating electric machine is applied to the electric power steering device. In the other configuration, the rotating electric machine is, for example, an in-vehicle electric motor, and may be applied to a motor other than the electric power steering device. Also, the rotating electric machine may be applied to the electric motor other than the in-vehicle electric motor.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A power conversion device comprising:
   an inverter that includes a plurality of high potential side switching elements connected to a high potential side and a plurality of low potential side switching elements connected to a low potential side, and converts a current to be supplied to a rotating electric machine;
   a current detector that includes a sensor disposed on at least one of a positive bus for connecting the high potential side switching elements and a positive side of a DC power supply or a negative bus for connecting the low potential side switching elements and a negative side of the DC power supply;
   an energization device that energizes the sensor without passing through the inverter; and a controller that acquires a current detection value from the current detector, and controls the inverter and the energization device, wherein the energization device energizes the sensor when all of the high potential side switching elements are in an off state, or when all of the low potential side switching elements are in an off state, wherein the controller controls a on and off operation of the high potential side switching elements and a on and off operation of the low potential side switching elements based on a PMW reference signal and a duty command value, wherein the controller generates at least one of a first state, in which all of the high potential side switching elements are in the off state, and a second state, in which all of the low potential side switching elements are in the off state, in one or more predetermined cycles of the PMW reference signal, and wherein the controller acquires the current detection value when the sensor is energized through the energization device in the first state, in which all of the high potential side switching elements are in the off state, or in the second state, in which all of the low potential side switching elements are in the off state, and when at least one of the high potential side switching elements and at least one of the low potential side switching elements are in a on state, in the predetermined cycle of the PMW reference signal.

2. The power conversion device according to claim 1,
wherein the controller acquires the current detection value when the sensor is not energized through the energization device in the first state, in which all of the high potential side switching elements are in the off state, or in the second state, in which all of the low potential side switching elements are in the off state, in the predetermined cycle of the PWM reference signal.

3. The power conversion device according to claim 1,
wherein the controller generates one of the first state, in which all of the high potential side switching elements are in the off state, and the second state, in which all of the low potential side switching elements are in the off state, and does not generate the other state of the first state and the second state, in at least one of a plurality of cycles of the PWM reference signals.

4. The power conversion device according to claim 1,
wherein the controller acquires a plurality of current detection values simultaneously.

5. The power conversion device according to claim 4,
wherein the current detector includes the sensor and a plurality of amplifier circuit units that amplify detection values detected by the sensor, and output amplified detection values to the controller as the current detection values.

6. The power conversion device according to claim 5,
wherein the current detection values output from the amplifier circuit units include at least one current detection value having a positive value or a negative value, which is opposite to other current detection values.

7. A power conversion device comprising:
an inverter that includes a plurality of high potential side switching elements connected to a high potential side and a plurality of low potential side switching elements connected to a low potential side, and converts a current to be supplied to a rotating electric machine;
a current detector that includes a sensor disposed on at least one of a positive bus for connecting the high potential side switching elements and a positive side of a DC power supply or a negative bus for connecting the low potential side switching elements and a negative side of the DC power supply;
an energization device that energizes the sensor without passing through the inverter; and
a controller that acquires a current detection value from the current detector, and controls the inverter and the energization device,
wherein the energization device energizes the sensor when all of the high potential side switching elements are in an off state, or when all of the low potential side switching elements are in an off state; and
wherein the power conversion device further comprises: a second power supply that supplies an electric power having a voltage, which is different from a voltage of the DC power supply for supplying an electric power to the rotating electric machine, to the energization device.

8. The power conversion device according to claim 1,
wherein the controller includes an abnormality detection unit that detects abnormality of the current detection value based on the current detection value.

9. The power conversion device according to claim 1 further comprising:
a group of resistors, each of which has one end connected to a connection point between the high potential side switching elements and the low potential side switching elements and the other end connected to a connecting portion connected to the positive bus or the negative bus,
wherein the controller includes an open failure detection unit that detects an open failure, in which the high potential side switching elements or the low potential side switching elements cannot turn on, based on a voltage of the connecting portion.

10. The power conversion device according to claim 1,
wherein the rotating electric machine is a three-phase rotating electric machine.

11. An electric power steering device comprising:
the power conversion device according to claim 1; and
the rotating electric machine that outputs an assist torque for assisting a steering operation of a driver of a vehicle.

* * * * *